(12) United States Patent
Brooks

(10) Patent No.: US 6,766,708 B2
(45) Date of Patent: Jul. 27, 2004

(54) GEAR RATIO MULTIPLIER

(76) Inventor: Eddie L. Brooks, 1051 Luther Dr., Magnolia, MS (US) 39652

( * ) Notice: Subject to any disclaimer, the term of this patent is extended or adjusted under 35 U.S.C. 154(b) by 0 days.

(21) Appl. No.: 09/834,108

(22) Filed: Apr. 13, 2001

(65) Prior Publication Data

US 2002/0029647 A1 Mar. 14, 2002

Related U.S. Application Data

(63) Continuation-in-part of application No. 08/912,397, filed on Aug. 18, 1997, now Pat. No. 5,913,938, and a continuation-in-part of application No. 09/063,010, filed on Apr. 21, 1998, now Pat. No. 6,244,126.

(51) Int. Cl.$^7$ ................................................ F16H 1/20
(52) U.S. Cl. .......................................... 74/424; 74/423
(58) Field of Search ................................ 180/374, 375, 180/376, 365; 74/745, 423, 424; 475/221, 225, 205

(56) References Cited

U.S. PATENT DOCUMENTS

| | | | |
|---|---|---|---|
| 2,625,231 A | | 1/1953 | Martin |
| 4,019,400 A | * | 4/1977 | Stump ........................ 74/333 |
| 4,060,005 A | * | 11/1977 | Bost ........................... 74/745 |
| 4,142,422 A | | 3/1979 | Haefner |
| 4,279,178 A | * | 7/1981 | Todd ........................... 74/745 |
| 4,325,450 A | * | 4/1982 | Ward ........................... 180/247 |
| 4,387,605 A | | 6/1983 | Grey et al. |
| 4,485,692 A | | 12/1984 | Moore et al. |
| 4,539,856 A | * | 9/1985 | Frost ........................... 74/363 |
| 5,411,450 A | * | 5/1995 | Gratton et al. .............. 477/124 |
| 5,913,938 A | * | 6/1999 | Brooks ........................ 74/417 |
| 6,244,126 B1 | * | 6/2001 | Brooks ........................ 74/423 |

* cited by examiner

Primary Examiner—Ankur Parekh

(57) ABSTRACT

In a first embodiment of the invention, a gear ratio multiplier has directly cooperating gears which serve to rotatably connect an input shaft to an output shaft through an intermediate shaft. The input and output shafts have parallel axes of rotation and extend, respectively, from seals in opposite sides of a housing. The inner ends of the input and output shafts are spaced from one another and are each provided with a pinion gear. The intermediate shaft is rotatably carried between the pinion gears and has an axis of rotation positioned at right angles to the axes of rotation of the input and output shafts. A pair of differently sized ring gears having different numbers of teeth are affixed on the intermediate shaft. The pinion gear on the input shaft engages the ring gear on the intermediate shaft whereas the pinion gear on the output shaft engages the ring gear on the intermediate shaft. The diameter pitch is a matter of advise per application as is the tooth size and tooth number. In this first illustrated embodiment, the gear ratio multiplier is utilized in the power train of a motor vehicle and positioned between the transmission and propeller shaft to modify the gear ratio between the and one or more drive axles. Other embodiments of the invention utilize other gear assembly arrangements such as, but not limited to, sun and planetary gear arrangements and ring and pinion gear arrangements. While a motor vehicle is shown, this use of a gear ratio multipliers is applicable to other devices or machines such as, but not limited to, water vehicles, helicopters, construction machinery or any other engine or motor driven device.

24 Claims, 20 Drawing Sheets

DATE:  
OWNER:  
VIN: 2GDEC19KXS1538635

TIME: 04:53 pm  
LICENSE: NY4 626  
ODOMETER: 48940

YEAR: 1995  
MAKE: GMC  
MODEL: 1500 PICKUP 2WD  
TYPE: LDGT 1

INERTIA WEIGHT (lbs): 4750  
LOAD @ 50 mph (hp): 18.5  
ENGINE SIZE (l): 5.7  
CYLINDERS: 8

TEST EVALUATION

ACTUAL: 1.978 MILES  
TARGET: 1.959 MILES

DRIVE CURVE VIOLATIONS: 0  
DRIVE CURVE EVALUATION: PASS

VOLUME: ---- LITERS PURGED

PURGE RESULTS: NONE

TEST RESULTS    CONDENSATION

|  | HC | CO | NOX | CO2 | EST. MPG |
|---|---|---|---|---|---|
| TOTAL GRAMS/mi:<br>COMPOSITE STANDARD:<br>COMPOSITE RESULTS: | 1.21<br>1.60<br>PASS | 4.61<br>40.00<br>PASS | 2.28<br>2.50<br>MARGINAL | 672.12 | 12.76 |
| PHASE 1 GRAMS/mi: | 2.37 | 9.78 | 3.65 | 686.06 | 12.19 |
| PHASE 2 GRAMS/mi:<br>PHASE 2 STANDARD:<br>PHASE 2 RESULTS: | 0.74<br>1.00<br>PASS | 2.55<br>32.00<br>PASS | 1.73 | 666.53 | 13.00 |
| FINAL RESULTS: | PASS | PASS | MARGINAL |  |  |

EPA IM240 FINAL STANDARDS

FIG. 15

DATE:  
OWNER:  
VIN: 2GDEC19KXS1538635

YEAR: 1995  
MAKE: GMC  
MODEL: 1500 PICKUP 2WD  
TYPE: LDGT 1

TIME: 02:29 pm  
LICENSE: NY4 626  
ODOMETER: 48940

INERTIA WEIGHT (lbs): 4750  
LOAD @ 50 mph (hp): 18.5  
ENGINE SIZE (l): 5.7  
CYLINDERS: 8

TEST EVALUATION

ACTUAL: 1.964 MILES  
TARGET: 1.959 MILES

VOLUME: ---- LITERS PURGED

DRIVE CURVE VIOLATIONS: 0  
DRIVE CURVE EVALUATION: PASS

PURGE RESULTS: NONE

TEST RESULTS    CONDENSATION

|  | HC | CO | NOX | CO2 | EST. MPG |
|---|---|---|---|---|---|
| TOTAL GRAMS/mi: | 0.79 | 2.74 | 1.79 | 752.70 | 11.53 |
| COMPOSITE STANDARD: | 1.60 | 40.00 | 2.50 | | |
| COMPOSITE RESULTS: | PASS | PASS | PASS | | |
| PHASE 1 GRAMS/mi: | 1.01 | 2.30 | 1.51 | 765.39 | 11.36 |
| PHASE 2 GRAMS/mi: | 0.70 | 2.91 | 1.90 | 747.68 | 11.59 |
| PHASE 2 STANDARD: | 1.00 | 32.00 | | | |
| PHASE 2 RESULTS: | PASS | PASS | | | |
| FINAL RESULTS: | PASS | PASS | PASS | | |

EPA IM240 FINAL STANDARDS

FIG. 16

GEAR RATIO MULTIPLIER

CROSS REFERENCE TO RELATED APPLICATION

This application is a continuation-in-part of application Ser. No. 08/912,397, filed Aug. 18, 1997, now U.S. Pat. No. 5,913,938 issued Jun. 22, 1999, and 09/063,010 filed Apr. 21, 1998 and now U.S. Pat. No. 6,244,126.

FIELD OF THE INVENTION

The present invention relates generally to machine elements or mechanisms and, in particular, to gearing systems having directly cooperating gears with intersecting axes of rotation so as to provide an alternative power transfer arrangement.

BACKGROUND OF THE INVENTION

Generally, there is a need to improve the efficiency of mechanical drives. One way to do this is to manipulate torque and speed so as to minimize torque losses when increasing speed such as, but not limited to, when gearing up to provide an overdrive for a vehicle. By a vehicle it is meant in this application any type of power transfer systems including road vehicles, construction vehicles, boats, air borne vehicles, and conveyances of any sort. There is also a need for improved power transfer systems in appliances and tools which have rotary drives such as, but not limited to, chain saws, lawn mowers, fans, vacuum cleaners, etc.

An understanding of the issue is gained when one considers transmissions which provide different gear ratios between an engine and the drive wheels of a typical land vehicle. The transmission enables the vehicle to accelerate from rest up to a maximum speed through a wide speed range while the engine operates efficiently. In most applications, the transmission is positioned in the vehicle power train between the engine and the propeller shaft. The engine's power flows through the transmission and propeller shaft and is delivered to the differential and drive axles.

Most vehicle transmissions operate within a preset range of gear ratios. This is a problem for special purpose vehicles, such as pickup trucks, used for carrying or towing heavy loads. Excessive engine and transmission wear, fuel consumption, and operating costs can result from gear ratios that are set too high at the time of their manufacture. A need, therefore, exists for original equipment and "add-on" assemblies which can be easily and economically inserted into the power train of a vehicle for modifying the gear ratio between the engine and drive axles. Moreover, there is need in passenger cars, boats, ships, helicopters, small trucks, heavy trucks, front wheel drives and motorcycles for improved efficiency and reduction in air pollution which results from improved efficiency.

SUMMARY OF THE INVENTION

In view of the limitations associated with known vehicle transmissions, it is a principal object of the invention to provide a gear ratio multiplier assembly which can be operatively connected between a factory installed transmission and propeller shaft to increase the speed ratio and torque between the engine and drive axles of the associated vehicle.

It is another object of the invention to provide a gear reduction featuring spiral bevel gears or hypoid gears. The tooth inclination of such gears providing advantages in maximizing torque while increasing output speed from an input shaft to an output shaft.

It is a further object of the invention to provide a gear ratio multiplier assembly of the type described which, during use, will increase torque imparted to the drive axles, decrease fuel consumption, increase engine and transmission life, and reduce vehicle operating costs.

It is an object of the invention to provide improved elements and arrangements thereof in a gear ratio multiplier assembly for the purposes described which is lightweight in manufacture, inexpensive in construction and installation, and fully effective in use.

In its broadest aspect, the present invention is directed to the concept of positioning a gear ratio multiplier between a transmission and drive shaft or propeller shaft of devices to provide power and rotation thereto, such as land, water or air vehicles, or any type of device or machine.

More specifically, the gear ratio multiplier comprises a gear assembly disposed between an engine and a driven device, wherein the gear assembly first increases torque by decreasing shaft speed (RPM) within the assembly and then increases shaft speed (RPM) before transferring that increased shaft speed to the driven device.

Briefly, the gear ratio multiplier in accordance with this invention achieves the intended objects by featuring directly cooperating gears which serve to rotatably connect an input shaft to an output shaft through an intermediate shaft. The input and output shafts each provided with pinion gears. The intermediate shaft has a pair of differently sized ring gears. The larger ring gear includes more teeth than the smaller ring gear. In one embodiment, the pinion gear on the input shaft engages the smaller ring gear whereas the pinion gear on the output shaft engages the larger ring gear. When rotated, the input shaft drives the output shaft with an accompanying mechanical advantage. In another embodiment, the pinion on the input shaft engages the larger ring gear and the pinion on the output shaft engages the smaller ring gear, however due to gear tooth number and pitch number selections the speed of the output shaft is still increased with respect to a drive shaft from the source of power.

While the aforementioned first embodiment was employed in a successful application of the invention, it is also within the scope of this invention to employ other types of gear assembly arrangements such as, but not limited to a variety of, planetary gear assemblies, ring gear and pinion arrangements.

Output ring gears outside diameters can appear in similitude of images or larger than the input ring gears, (A) outside diameters. But the parameters sum of geometric ratio in (B) angulation diameters of output ring gears and gears meshing members can/should be smaller than input gears.

The foregoing and other objects, features and advantages of the present invention will become readily apparent upon further review of the following detailed description of the various preferred embodiments as illustrated in the accompanying drawings.

BRIEF DESCRIPTION OF THE DRAWINGS

The present invention may be more readily described with reference tot accompanying drawings, in which:

FIG. 15 is a chart showing emissions for vehicle not equipped with a gear ratio multiplier;

FIG. 16 is a chart showing emissions for a vehicle equipped with a gear ratio multiplier according to the present invention.

Similar reference characters denote corresponding features consistently throughout the accompanying drawings.

DETAILED DESCRIPTION

Figure 1A:
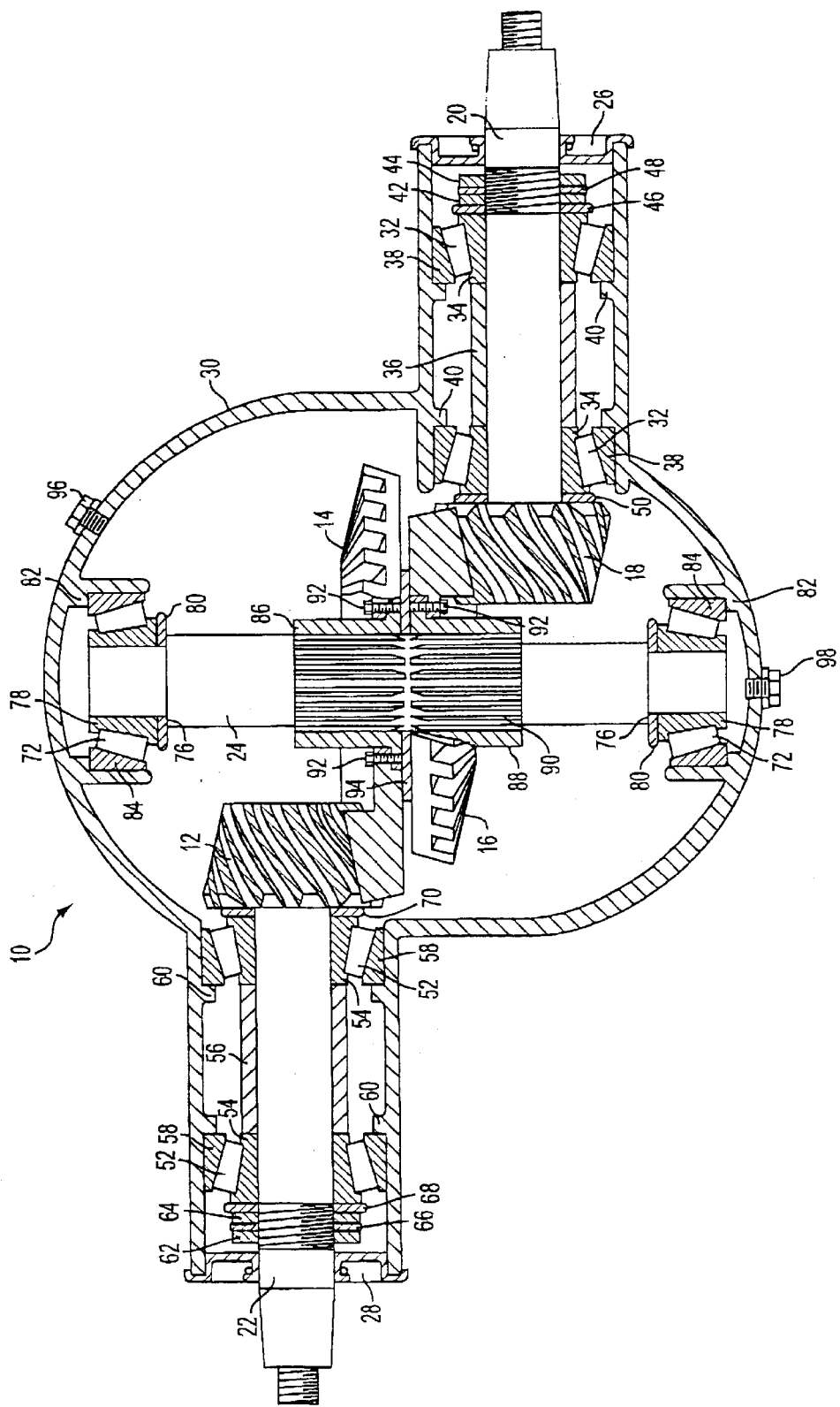
FIG. 1A is a cross-sectional view of a first embodiment of a ear ratio multiplier in accordance with the present invention.

Referring now to the FIG. 1A, a gear ratio multiplier assembly in accordance with the present invention is shown at 10. The assembly 10 includes four, directly cooperating gears 12, 14, 16, and 18 which serve to rotatably connect an input shaft 20 to an output shaft 22 through an intermediate shaft 24. The input shaft 20 and output shaft 22 have parallel axes of rotation and extend, respectively, from seals 26 and 28 in opposite sides or ends of a housing 30. The inner ends of the input and output shafts 20 and 22 are spaced from one another and are provided with substantially identical pinion gears 12 and 18.

There is an input gear set 31 comprised of input pinion gear 18 and input ring gear 16 and an output gear set 33 defined by output pinion 12 and output ring gear 14.

As is seen in FIG. 1A, at least the pinion gears 12 and 18 are spiral bevel gears which necessarily have tooth inclination, i.e., the teeth are disposed at an angle relative to the axes of the pinion gears. The gears may also be hypoid gears or may be different gear set designs such as spiral bevels in and hypoids sets in and spiral bevel out might proceed with spurs helicals and/or intervals. The intermediate shaft 24 is rotatably carried between the pinion gears 12 and 18 and has an axis of rotation positioned at right angles to the axes of rotation of both the input shaft 20 and output shaft 22. A pair of ring gears 14 and 16, having different numbers of teeth, are affixed in a back-to-back relationship on the intermediate shaft 24. In the illustrated embodiment, the ring gears are preferably a unitary structure. The pinion gear 18 on the input shaft 20 engages the relatively smaller, ring gear 16 to form a first gear assembly on the intermediate shaft 24 whereas the pinion gear 12 on the output shaft 22 engages the relatively larger, ring gear 14 to form a second gear assembly on the intermediate shaft. When rotated during use, the input shaft 20 drives the output shaft 22 with an accompanying mechanical advantage which increases the gear ratio and torque while decreasing engine RPM when an engine is connected thereto (See FIG. 2).

Figure 2:
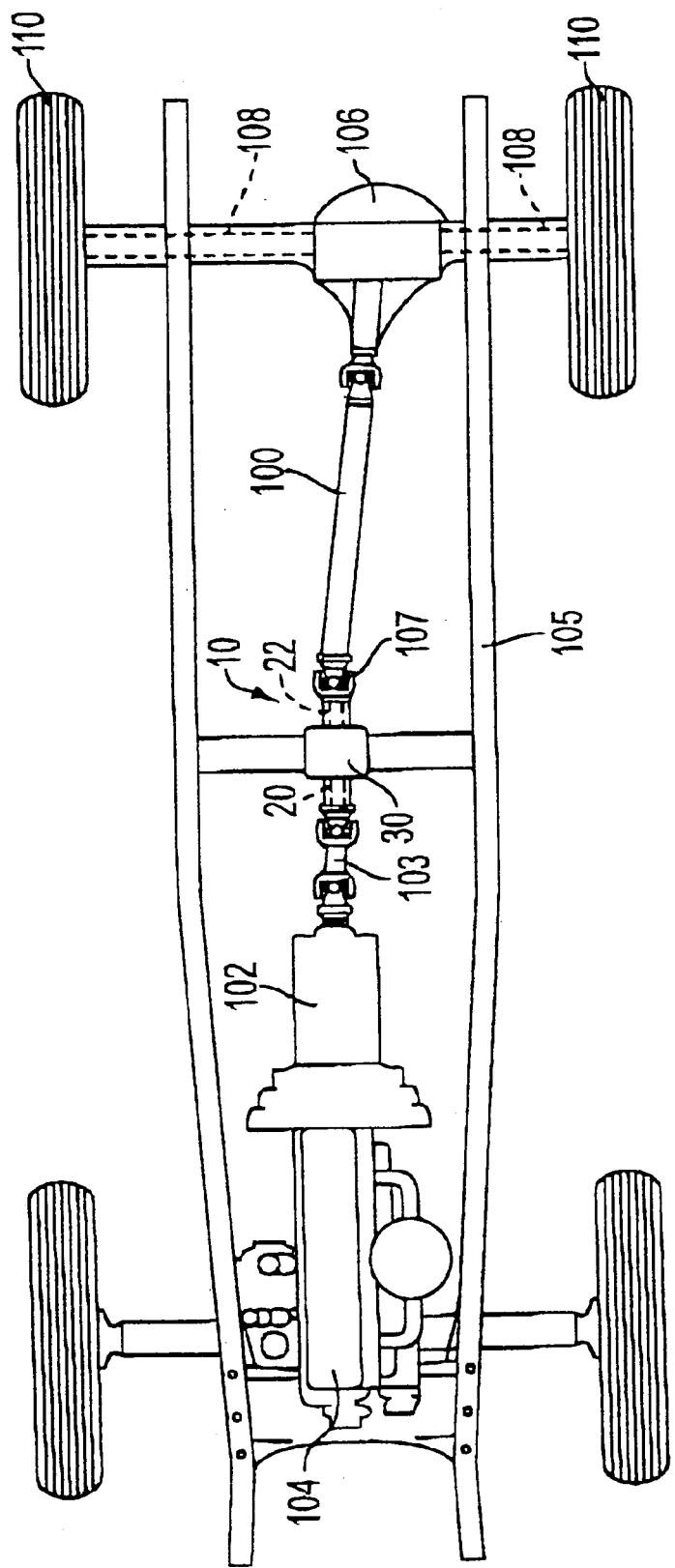
FIG. 2 is a diagrammatic view of a vehicle power train including the transmission of FIG. 1.

As is seen in FIG. 1A, the pinions 12 and 18 have the same diameter (since they are substantially identical) however the diameter may be merely close or different as with other embodiments of the invention. The first ring gear 16 has a larger diameter than the first pinion 18 with which it meshes, accordingly, the second ring gear 14 rotates through a larger angular rotation than the second pinion 12 and thus at an increased speed. Output ring gears outside diameters can appear in similitude of images or larger than the input ring gears, (A) outside diameters. But the parameters sum of geometric ratio in (B) angulation diameters of output ring gears and gears meshing members can/should be smaller than input gears. The second ring gear 14 has a larger diameter than the first ring gear 16, but it rotates at the same speed as the first ring gear 16 because it is fixed to the same shaft, shaft 24. Since the second ring gear 14 has a larger diameter, it has more teeth than the first ring gear 16; however second ring gear 14 meshes with second pinion 12 which has the same number of teeth as the first pinion 18. Therefore, one rotation of second ring gear 14 necessarily results in more than one rotation of the second pinion 12 so that there is an increase in speed between the second ring gear 14 and second pinion 12. In the arrangement of FIG. 2, the result of FIG. 7 occurs where there is an increase in speed with minimal reduction in torque which results in an increase in horsepower when coupled to a motor driven vehicle and/or other devices.

In the arrangement of FIG. 1A, the ratio of the pitch diameter ($Pd_{18}$) of the first pinion 18 to the pitch diameter ($Pd_{16}$) of the first ring gear 16 is larger than the ratio of the pitch diameter ($PD_{12}$) of the second pinion 12 to the second pitch diameter ($Pd_{14}$) of the ring gear 14. The ratio of the number of teeth ($Nt_{18}$) of the first pinion 18 to the number of teeth ($Nt_{16}$) of the second ring gear 16 is less than the ratio of the number of teeth ($Nt_{12}$) of the second pinion 12 to the number of teeth ($Nt_{14}$) of the second ring gear 14.

In other words the arrangement of FIG. 1 satisfies the conditions:

INPUT    OUTPUT $$\frac{Pd_{18}}{Pd_{16}} > \frac{Pd_{12}}{Pd_{14}}, \text{ and}$$

$$\frac{Nt_{18}}{Nt_{16}} > \frac{Nt_{12}}{Nt_{14}}$$

The input shaft 20 is rotatably supported within the housing 30 by a pair of roller bearings 32 spaced along its length. The inner races 34 of the bearings 32 are maintained at a fixed distance from each other by a tubular spacer 36 encircling the input shaft 20. The outer races 38 of the bearings 32, however, are held apart by stops 40 projecting inwardly from the side walls of the housing 30. A pair of lock nuts 42 and 44 threaded onto the outer end of the input shaft 20, along with adjacent washers 46 and 48, serve to drive the bearings 32 together and fix the position of the pinion gear 18 within the housing 30. Fine longitudinal adjustment of the position of the pinion gear 18 is achieved by varying the thickness of the washer 50.

Like the input shaft 20, the output shaft 22 is rotatably supported by spaced roller bearings 52. The inner races 54 of the bearings 52 are maintained in position by a tubular spacer 56 whereas the outer races 58 are supported by stops 60. Similarly, lock nuts 62 and 64 and washers 66 and 68, secured to the output shaft 22, fix the position of the pinion gear 12. A washer 70 of predetermined thickness is positioned on the output shaft 22 and against the pinion gear 12 to finely adjust the position of the gear 12.

The intermediate shaft 24 is rotatably journaled at its opposite ends in roller bearings 72. Shoulders 76 on the intermediate shaft set the respective positions of the inner races 78 of the bearings 72. Spacing washers 80, of predetermined thickness and located between the shoulders 76 and inner races 78, permit the vertical positioning of the intermediate shaft 24 to be adjusted as desired by a user. Stops 82 projecting inwardly from the side walls of the housing 30 retain the outer races 84 of the bearings 72.

Although the pinion gears 12 and 18 are preferably machined onto the ends of the shafts 20 and 22 so as to form an integral part thereof, the ring gears 14 and 16 are preferably releasably secured to the intermediate shaft 24. As shown, a pair of ring gear cranks 86 and 88 are connected by means of grooves 90 to the intermediate shaft 24 for rotation therewith. Bolts 92 secure the ring gears 14 and 16 to the cranks 86 and 88. A disk-shaped spacer 94 separates the cranks 86 and 88 as well as the ring gears 14 and 16.

Openings are provided in the housing 30 for adding and withdrawing lubrication oil. An opening, normally closed by bolt 96, in the top of the housing 30 is provided for filling the housing 30 with oil prior to normal use of the assembly 10. An opening, closed by bolt 98, in the bottom of the housing 30 permits used oil to be drained from the housing 30.

Figure 1B:
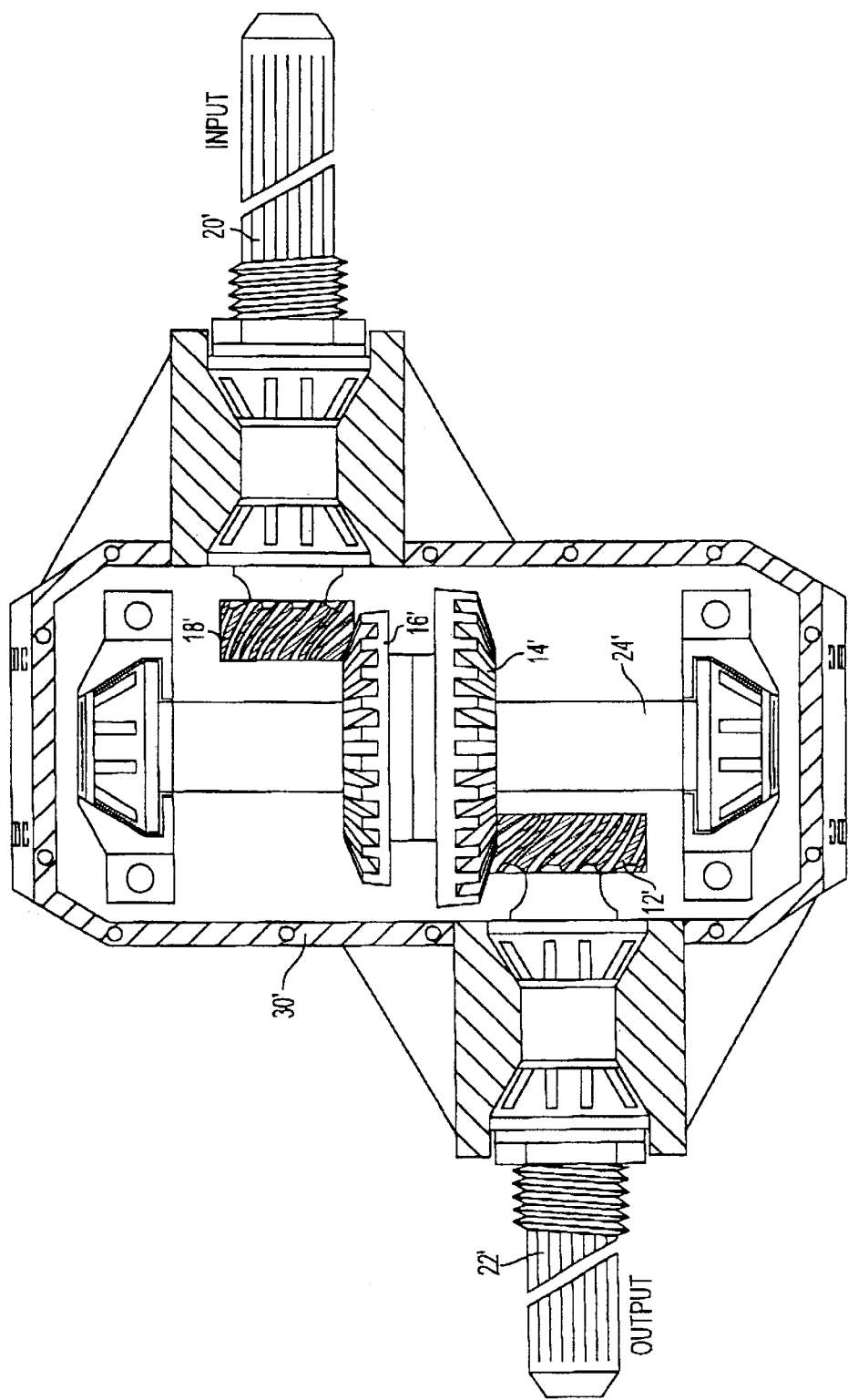
FIG. 1B is a variant of FIG. 1A.

Referring now to FIG. 1B there is shown variant of FIG. 1A wherein the input pinion 18' has a tooth number $NT_{18'}$ and pitch diameter $Pd_{18}$ different from the tooth number $Nt_{12}$ and pitch diameter $Pd_{12}$, of the output pinion 12'. In a specific embodiment exemplary, but not limitative, of the invention the gear ratio multiplier 10' of FIG. 1B has an input gear set 31 ' comprised of a 2.28 Chrysler or General Motors hypoid gear set and an output gear set 33' comprised of a 3.13 Ford hypoid gear set. The gears have the following characteristics:

Example I

| Input set 31' (First Gear Assembly) | | Output set 33' (Second Gear Assembly) | |
| --- | --- | --- | --- |
| Input pinion 18' tooth number | 14 | Output pinion 12' tooth number | 15 |
| Input ring 16' tooth number | 32 | Output ring 14' tooth number | 47 |
| Input pinion 18' pitch diameter | 3.37 in. | Output pinion 12' pitch diameter | 4.1 in. |
| Input ring 16' pitch diameter | 7.2 in. | Output ring 14' pitch diameter | 8.5 in. |
| Input Tooth Number Ratio | 2.28 | Output Tooth Number Ratio | 3.13 |
| Input Pitch Diameter Ratio | 2.13 | Output Pitch Diameter Ratio | 2.07 |
| Overdrive 3.13 − 2.28 = 0.85° ÷ 3.6 = 23.6% | | Pitch Diameter Sum → 2.13 − 2.07 = 0.06 | |

Figure 13:
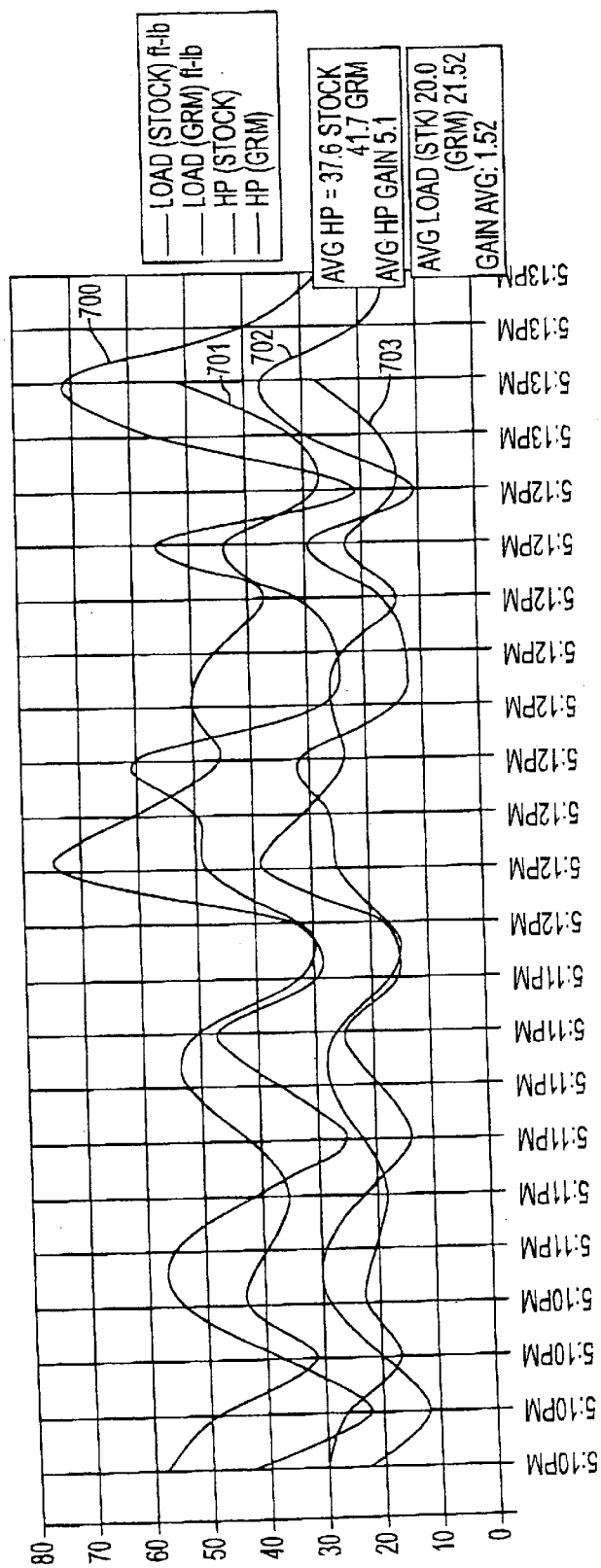
FIG. 13 is a graph plotting load (in foot-pounds) for a stock vehicle and for a vehicle equipped with a gear ratio multiplier according to the present invention as represented by the variant of FIG. 1B, as well as horse power for a stock vehicle and a vehicle equipped with the gear ratio multiplier, both over a 3 minute time interval.

The variant of FIG. 1B has the test results of FIG. 13.

Figure 1C:
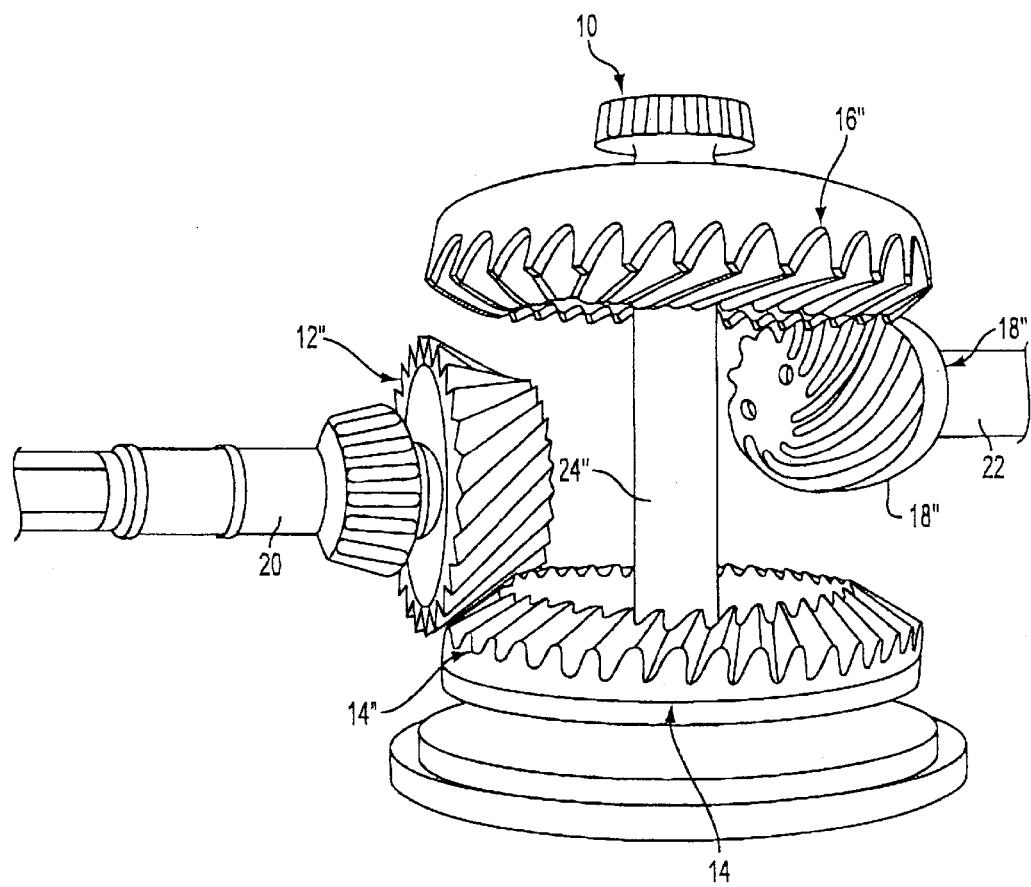
FIG. 1C is a variant of FIGS 1A and 1B.

Referring now to FIG. 1C, there is shown another gear ratio multiplier variant 10" of the FIGS. 1A and 1B wherein the ring gears 16" and 18" are spaced on the shaft 24" instead of being back-to-back so that the ring gears are face to face and the input shaft 20" and output shaft 22" are more centered. In the gear ratio multiplier 10" of FIG. 1C the input gear set 31" is a 2.28 Chrysler or General Motors hypoid gear set and the output gear set 33' is a 3.07 Ford hypoid gear set. Again, the specific example is illustrative but not limitative of the invention.

Example II

| First Gear Assembly | | Second Gear Assembly | |
| --- | --- | --- | --- |
| Input pinion 18" tooth number | 14 | Output pinion 12" tooth number | 14 |
| Input ring 16" tooth number | 32 | Output ring 14" tooth number | 43 |
| Input pinion 18" pitch diameter | 3.37 in. | Output pinion 12" pitch diameter | 3.9 in. |
| Input ring 16" pitch diameter | 7.2 in. | Output ring 14" pitch diameter | 8.0 in. |
| Input Tooth Number Ratio | 2.44 | Output Tooth Number Ratio | 3.07 |
| Input Pitch Diameter Ratio | 2.13 | Output Pitch Diameter Ratio | 2.01 |
| Distance Increase 307 − 2.28 = 0.79 ÷ 3.6 = 21.9% | | Pitch Diameter Sum 2.13 − 2.01 = 0.12 | |

Figure 1D:
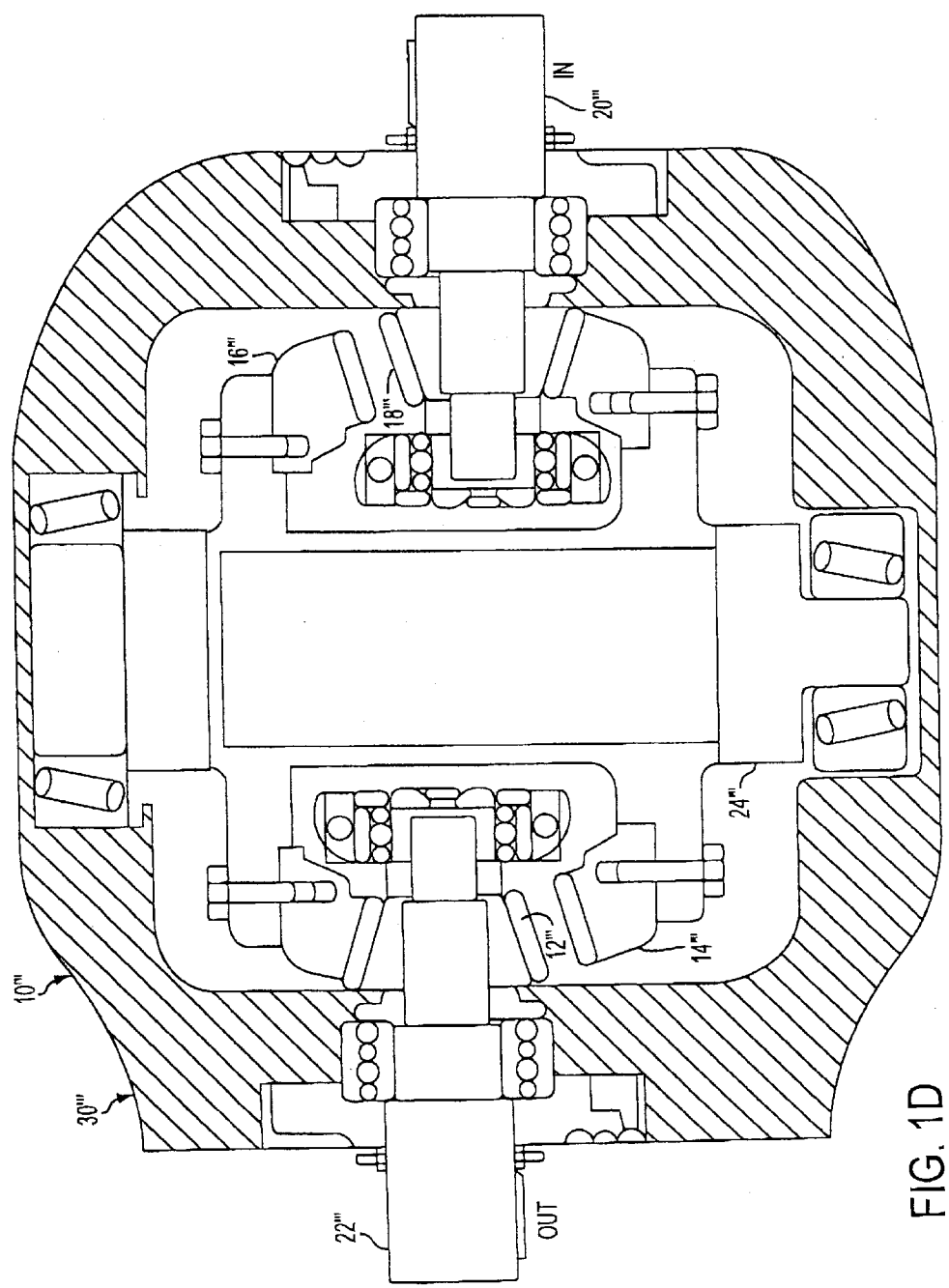
FIG. 1D is a further variant of FIGS 1A–1C.

Referring now to FIG. 1D, there is shown a further gear ratio multiplier variant 10'" of FIGS. 1A–1C wherein the pinions 18'" and 12'" are overhung by the ring gears 16'" and 14'" respectively. The input and output shafts 22'", respectively straddle mount the pinion 18'" and 12'" in the housing 30'". The resulting structure is strong and compact. The gears as the variant 10'" may for example have the tooth and pitch diameter ratios of Examples I and II.

Installation of the assembly 10, 10', 10" or 10'" in a vehicle unequipped with such is straight forward and illustrated diagrammatically in FIG. 2. The propeller shaft 100 of the vehicle is first removed and shortened somewhat using conventional machine tools and processes. Next, the input shaft 20 is aligned with the transmission 102 and is joined to it with connector 103. The housing 30 is then secured by any suitable means to the undercarriage 105 of the vehicle. Finally, the shortened propeller shaft 100 is joined to the output shaft 22 of the assembly 10 using connector 107. When the vehicle engine 104 is now energized to drive the transmission 102, power will flow through the gear ratio multiplier assembly 10–10'" selected and through the propeller shaft 100, differential 106 and drive axle 108 to drive wheels 110.

Figure 3:
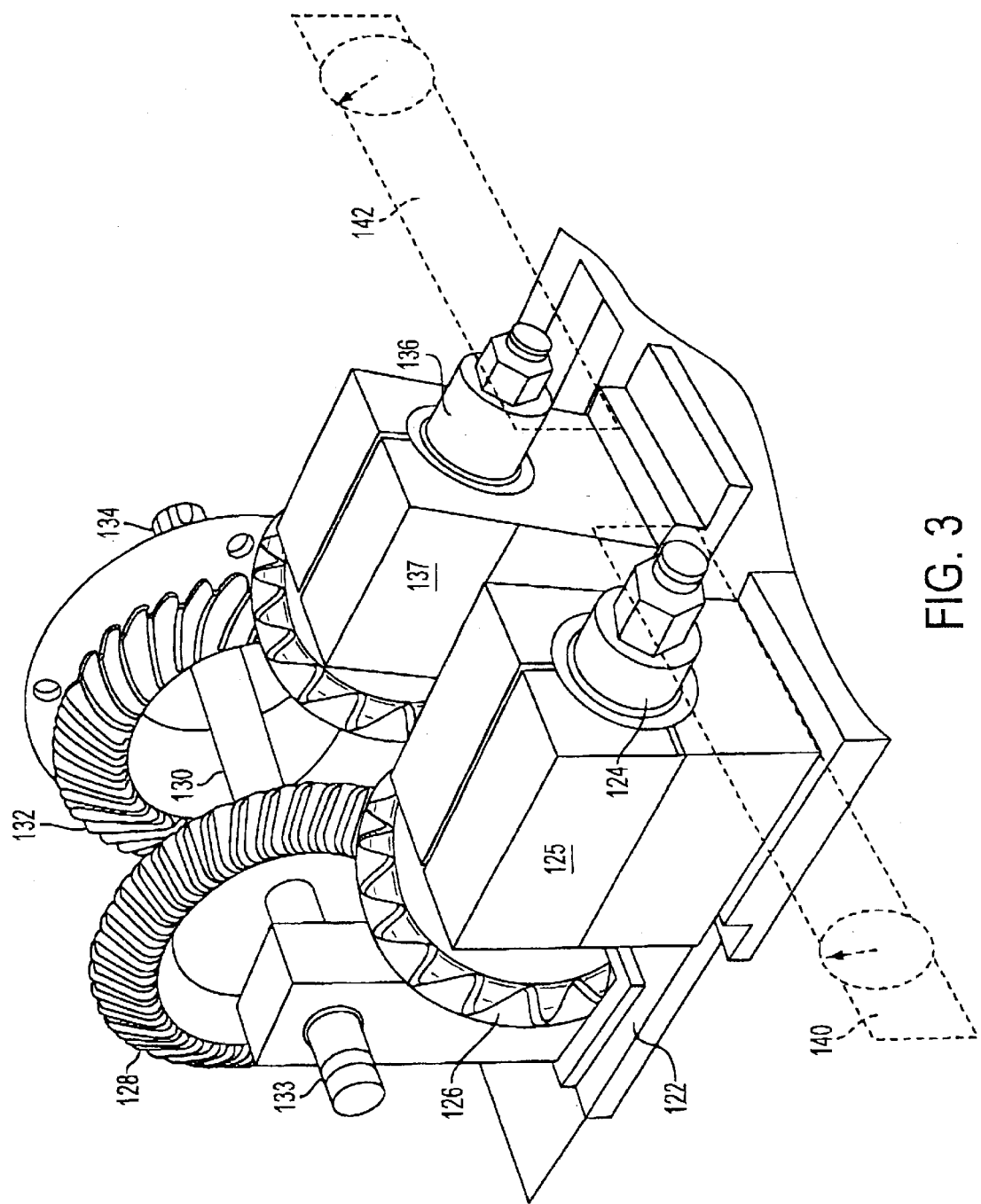
FIG. 3 is a diagrammatical view of a second embodiment of a gear ratio multiplier according to the present invention.

Referring now to FIG. 3 there is shown an experimental arrangement 118 similar to FIG. 1C configured to demonstrate principles of the present invention. The experimental arrangement 118 discloses an overdrive gear train arrangement 120 mounted on a base 122. Input shaft 124 is journaled in a bearing 125 mounted on the base 122 and supports input pinion 126. Input pinion 126 is meshed with an input ring gear 128 that is mounted on an intermediate shaft 130 which also mounts an output ring gear 132. Output shaft 130 is supported by a pair of journals 133 and 134 fixed to the base 122. Output ring gear 132 meshes with an output pinion 134 supported by output shaft 136 which is mounted on a journal 137 fixed to the base 122. The input and output pinions 126 and 134 are spiral bevel gears as are the input and output ring gears 128 and 132.

To demonstrate the principles of the present invention, the input pinion 126 had a pitch diameter of 3.6 inches and the input ring 128 has a pitch diameter of 7.2 inches. The pitch diameter ratio is therefore 2.0. Input pinion 126 has 17 teeth while the input ring gear 128 has 36 teeth so that the tooth ratio is 2.11. The output pinion 134 has a pitch diameter of 4.2 inches and the output ring 132 have as a pitch diameter of 7.5 inches. The pitch diameter ratio is therefore 1.7. The output pinion 134 has 17 teeth while the output ring gear 132 has 46 teeth, resulting in a tooth ratio of 2.70.

In the arrangement of FIG. 3, the input pitch diameter ratio 2.0 is higher than the output pitch diameter ratio of 1.78. The input tooth ratio of 2.11 is lower than the output tooth ratio of 2.70. These pitch diameters, tooth numbers and ratios are merely illustrative of parameters selected to demonstrate the principals of the invention. Other parameters may be selected.

Torque is a function of pitch diameter and speed is a function of tooth number. The arrangement of FIG. 3, since the input pitch diameter ratio (2.0) is greater than the output pitch diameter ratio (1.78), the input torque ratio is higher that the output torque ratio. Moreover, in the arrangement of Attachment 2 since the input tooth ratio 2.11 is less than the output tooth ratio of 2.70, the input speed ratio is less than the output speed ratio.

In order to measure speed ratios, occasional distance is measured by rotating the input shaft 124 through one revolution while observing the rotational distance of the output shaft 136. Because of the tooth ratios of the gears 126, 128, 132 and 134, the rotation of the shaft 136 is 450 degrees for each 360° revolution of the input shaft 124. In other words, there is an overdrive of 25%. This is because tooth rotation is preditated by tooth numbers i.e. 2.70-2-11=2.59 or $^+$0.59÷3.6=16.3. The reality is 2.90 or 25%. When measuring rotational degrees from input gear sets to rotating degrees of output gear sets, tooth size and tooth angles, or differences in tooth angle and size, can and will have a noticeable change between input and output gear set ratios according to a fixed tooth ratio.

In order to determine transmission of torque, a first torque wrench 140 is placed on the input shaft 124 and a second torque wrench 142 is placed on the output shaft 136. While keeping the output shaft 136 stationary with the torque wrench 142, torque is applied to the input shaft 124. Applying 15 ft.-lbs. of torque to the input shaft 124 with the torque wrench 140 and observing torque measurements on the torque wrench 142 the output shaft 136 showed a decrease in torque of less than 3%. Consequently, in a static situation there is no substantial loss of torque even though there is substantial speed overdrive.

On performing the same test with commercial overdrive, such as the Borg-Warner "Basic 1" transmission equipped with an overdrive having a 25% or 90° advance, a 25 ft.-lbs. torque input results in only an 18 ft.-lbs output which is a loss of 7 lbs. of torque so there is 28% more power lost than distance gained. Clearly, the arrangement 120 of FIG. 3 demonstrates an increase in speed while minimizing reduction in torque as compared to currently available transmissions.

Figure 4:
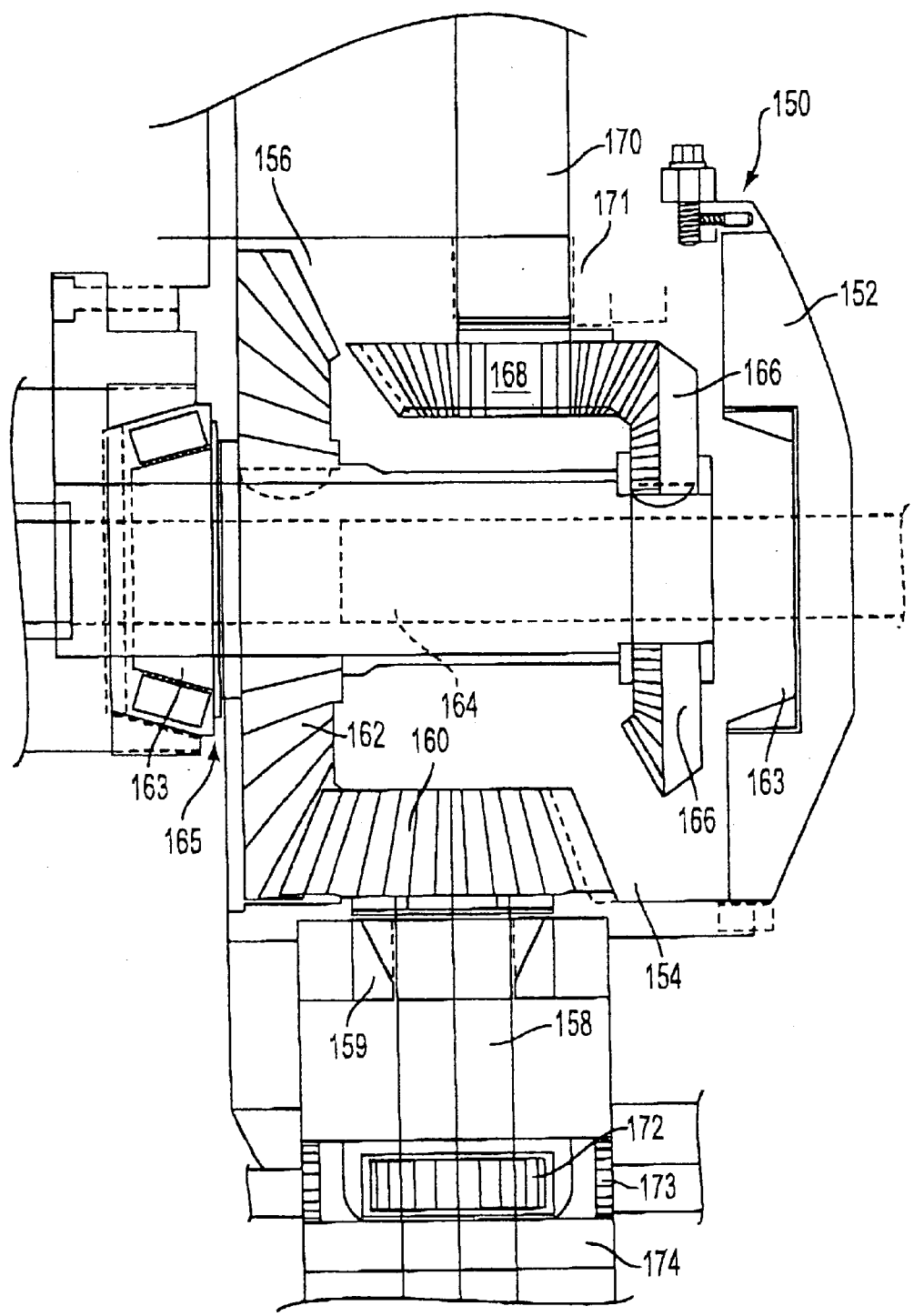
FIG. 4 is a cross-sectional view of a third embodiment of a gear ratio multiplier according to the present invention.

Referring now to FIG. 4 there is shown a third embodiment 150 of a gear ratio multiplier configured as an overdrive in accordance with the present invention. Gear ratio multiplier 150 is mounted within a housing 152 which includes an input side 154 and an output side 156. An input shaft 158 is mounted in a journal 159 to the housing 152 and has fixed thereon an input pinion 160. The input pinion 160 is meshed with an input ring gear 162 which is mounted on an intermediate shaft 164 to form a first gear assembly 165 which is journaled by journals 163 in the housing 152. On the opposite side of the pinion 160 there is an output ring gear 166 also mounted on the intermediate shaft 164. Output ring gear 166 meshes with an output pinion 168 to form a second gear assembly 169 having an output shaft 170 journaled in a bearing 171 in the housing 152. Gears 160, 162, 166 and 168 are preferably spiral beveled gears. The first and second gear assemblies 165 and 169 are preferably in this embodiment first and second spiral bevel gear sets.

On the input side 154, the pinion gear 160 has a pitch diameter of 4.095 inches, while the input ring gear 162 has pitch diameter of 8.375 inches. Accordingly, the input pitch diameter ratio is 8.375/4.095=2.05. Input pinion 160 has 22 teeth while the input ring gear has 45 teeth. Consequently, the tooth number ratio is 45/22 is about 2 to 1.

On the output side 156, the output pinion 168 has a pitch diameter of 4.0 inches (substantially equal to that of the input pinion) while the output ring gear 166 has a pitch diameter of 6.0 inches. Consequently, the pitch diameter ratio is 1.5. The output pinion 168 has 20 teeth while the output ring gear 166 has 30 teeth. Accordingly, the output tooth ratio is 30/20 or also 1.5.

In order to properly mate the gear ratio assembly 150 of FIG. 4 so as to function as an overdrive within the drive train of a vehicle, the input shaft 158 which is connected to the input pinion 160 is driven by a set of spur gears 171 comprised of pinion 172 fixed to the input shaft 158 and a ring gear 173 fixed to a hollow portion of a drive shaft 174 driven by the drive train of the vehicle as seen in FIG. 1. The speed increase from the drive shaft 174 to the input shaft is 1.5:1.

As the ring gear 173 is rotated by the drive shaft 174, the pinion 172 rotates the input shaft 158 or 360° at input shaft 174. This results in a 1.5:1 or a 540° output to input shaft 158 to drive the shaft 170 via the gear ratio multiplier 150. In order for the particular gear ratio multiplier 150 to function as an overdrive the spur gear set 171 performs a speed increase of 1.5:1 from the drive shaft 174 to the input shaft 158. For the dimensions and ratios gears 160, 162, 166 and 168 of the gear ratio multiplier 150, the pinion 172 has 14 teeth while the ring gear 174 has 21 teeth resulting in a tooth ratio of and a speed increase of 1.5 or 150% i.e. a 50% increase (the pitch diameter of the pinion 172 is 2.85 inches and the pitch diameter of the ring gear is 3.70 inches so the pitch diameter ratio is 1.450). It is the speed increase of 1.5 of the gear set 171 which meshes the overdrive provided by the gear ration multiplier 150 to function as an overdrive. This is because the 2:1 speed ratio of the input side 154 actually relates to the speed of the drive shaft 174 which has been increased by the gear set 171 by a factor of 1.5 when applied to the input shaft 158. The gear teeth of the spiral bevel input gears 160 and 162 are substantially larger than those of the spiral bevel output gears 166 and 168.

Figure 5:
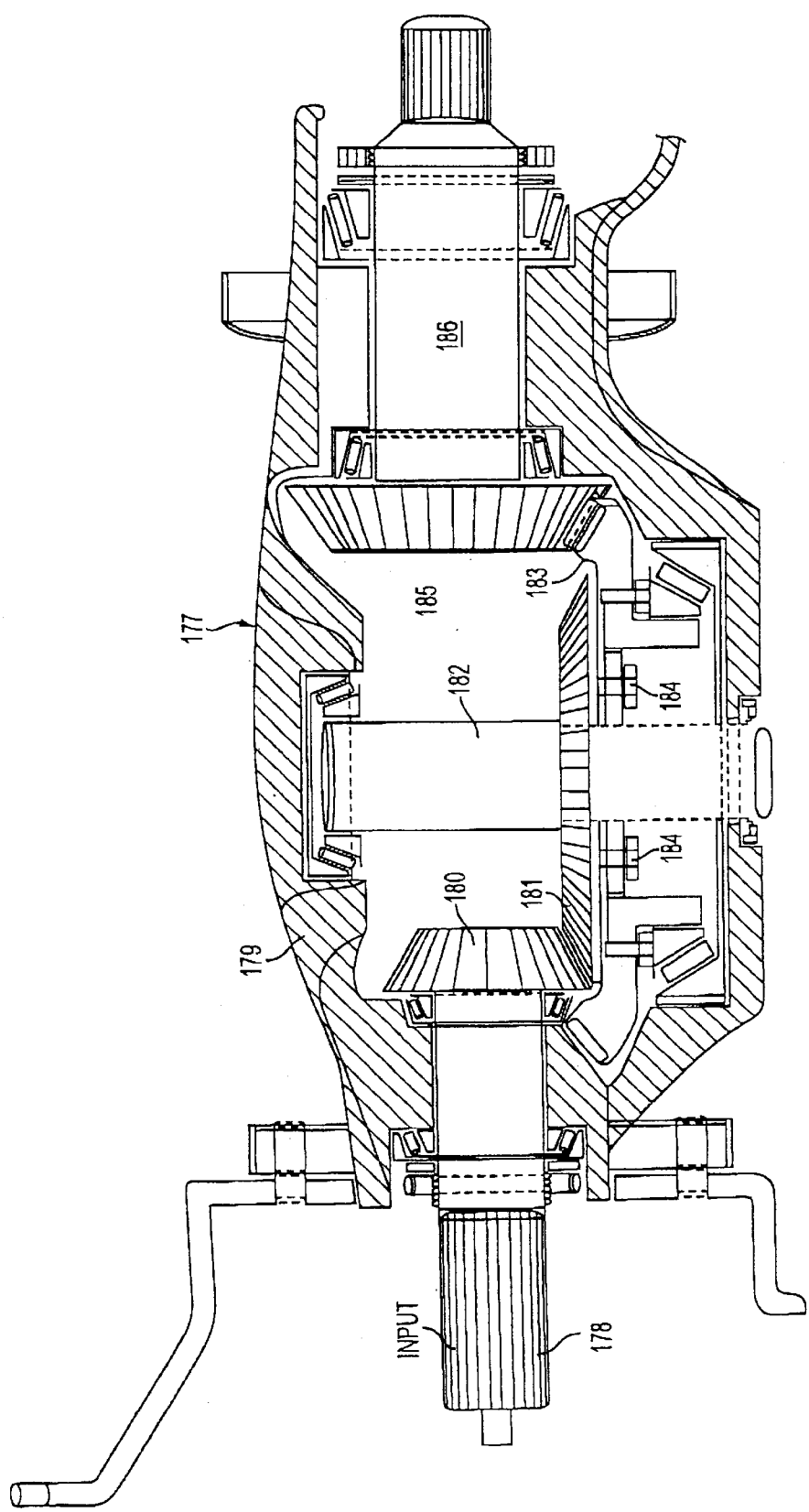
FIG. 5 is a side view of a fourth embodiment of a gear ratio multiplier according to the present invention.

Referring now to FIG. 5, an embodiment of the gear ratio multiplier is shown configured as an overdrive 177 for vehicles. In the overdrive 177 there is an input shaft 178 which is journaled in a housing 179. The input shaft 178 has input pinion 180 fixed thereon which is meshed with input ring gear 181. The input ring gear 181 is mounted on an intermediate shaft 182 which is also journaled in the housing 179. An output ring gear 183 is bolted to the input ring gear 181 by bolts 184 to rotate therewith and is meshed with an output pinion gear 185. The output pinion gear 185 is mounted on an output shaft 186 which is connected through to the wheels of a vehicle as is shown in FIG. 1. Gears 180, 181, 183, and 185 are preferably spiral beveled gears. The pitch diameter ratio of the input ring gear 181 to the input pinion 180 (which may be straight, zerol bevels or hypoid gears) being greater than the pitch diameter ratio of the output ring gear 183 to the output pinion gear 185. The tooth ratios in the gears comprising the overdrive are selected so that the output shaft 186 rotates faster than the input shaft 178.

Figure 6:
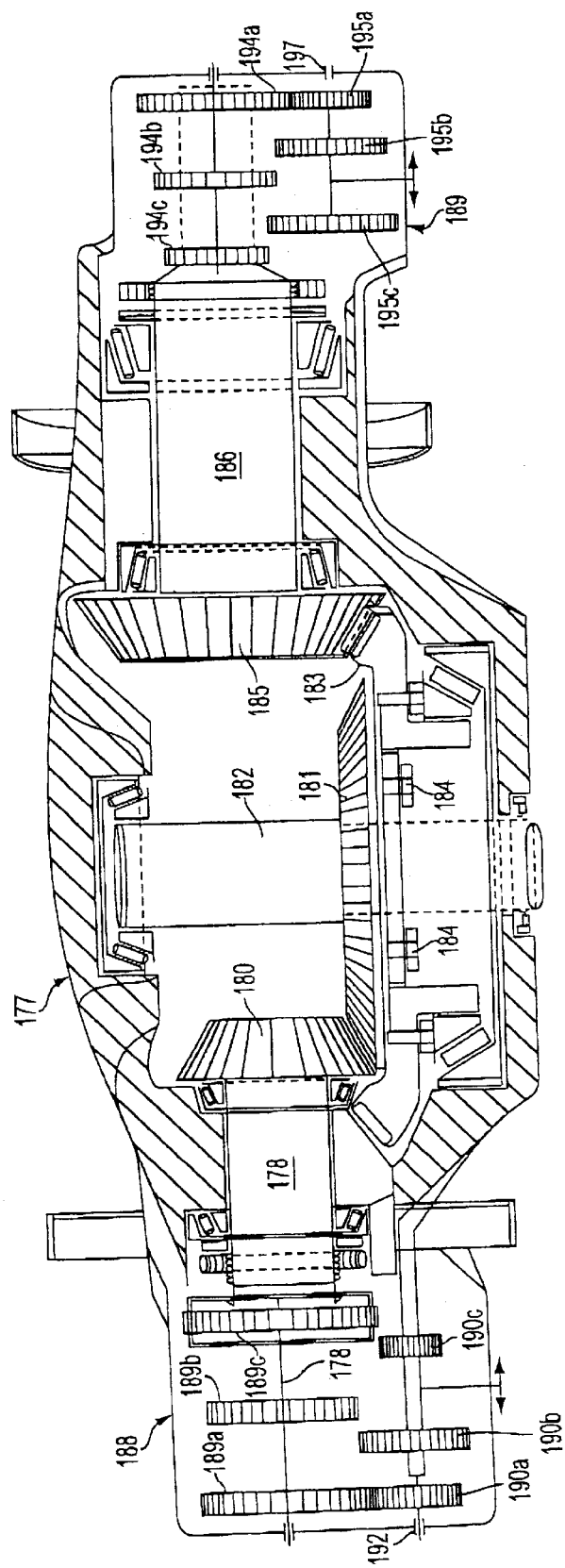
FIG. 6 is a side view of the gear ratio multiplier of FIG. 5 with a variable speed gear box on both the input and output shafts thereof.

Referring now to FIG. 6, the overdrive 177 has a gear box 188 attached to the input shaft 178 and a gear box 189 attached to the output shaft 186. Gear box 177 has the gears 189a, 189b and 189c fixed with respect to the input shaft 178. These gears are selected individually in a conventional way by a set 190 of axially shiftable mating gears 190a, 190b and 190c which are mounted on an axially shiftable shaft 191 coupled to an a drive shaft 192 of a source of power and rotation such as for example an engine (not shown). By shifting the shaft 191 three input speeds are selectable for the overdrive 177.

The gear box 189 on the output shaft 186 has gears 194a, 194b and 194c connected to rotate directly with the output shaft 186. The gears 194a, 194b and 194c are selected individually in a conventional way by axially shiftable mating gears 195a, 195b and 195c mounted on a shaft axially shiftable shaft 196 that is coupled to the wheels of a vehicle (see FIG. 2) or output and/or input of other devices, gear ratio multipliers, etc. so as to repeat the first benefits.

With the gear boxes 188 and 189 operating simultaneously, a gearing arrangement having nine speeds in combination with the overdrive 177 is provided. The gear boxes 188 and 189 could also be automatic transmissions.

Figure 7:
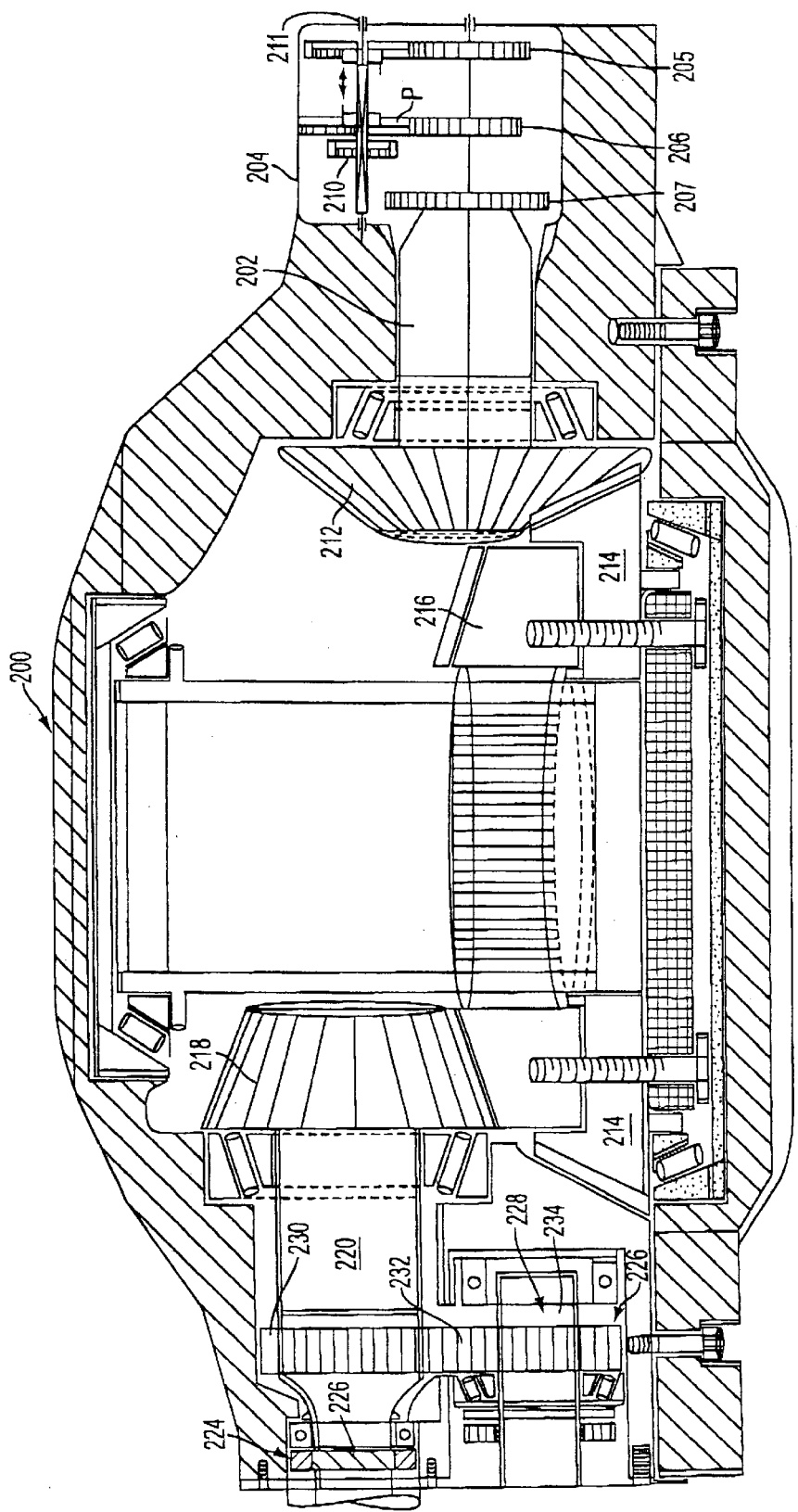
FIG. 7 is a side view of a fifth embodiment of the gear ratio multiplier with a variable speed gear box on the input and a dual speed output.

Referring now to FIG. 7 where there is shown a fifth embodiment of the invention configured as an overdrive 200 wherein an input shaft 202 is driven by a gear box 204 having gears 205, 206 and 207 coupled directly to the input shaft 202. The gears 205, 206 and 207 mesh directly with gears 208, 209 and 210, respectively, having ratios of 1:1, 0.81:1 and 2:1, respectively which are mounted to rotate directly with a drive shaft 211.

The input shaft 202 drives an input pinion 212 which meshes an input ring gear 214 and the output ring gear 216 meshes with an output pinion 218 that drives an output shaft 220. In the drive 200, the input ring gear 214 has a greater pitch diameter than the output ring gear 216, however since the gear box 204 reduces the speed of drive shaft 211, the principles of the present invention still hold because the over drive 200 functions like the drive 150 of the third embodiment shown in FIG. 4. This is accomplished by selecting a tooth number for the input ring gear 214 of 41 teeth and for the input pinion 212 of 17 teeth resulting in an input tooth ratio of 2.41. The input pitch diameter ratio is 2.41. The output ring gear 216 faces obliquely with respect to the input ring gear 214 and also has 41 teeth while the output pinion gear has 15 teeth resulting in an output tooth ratio of 2.73. The pitch diameter of the output pinion gear is 3.50 resulting in a pitch diameter ratio of 2.08. The gears 212, 214, 216 and 218 are preferably spiral bevel gears or hypoid gears. The output shaft 220 has a pinion gear 224 thereon which may be a spur or helical gear and which meshes with a spur or helical gear 226 fixed to an output power shaft 228.

Optionally the output power shaft 220 has a driving gear 230 fixed thereon which meshes with a driven gear 232 of a supplemental output drive shaft 234. The gears 230 and 232 have tooth numbers of 14 teeth and 12 teeth, respectively resulting in a tooth ratio of 1.16. They have pitch diameters of 2.5 and 2.1, respectively, resulting in a pitch diameter ratio of 1.2. Since the shafts 220 and 234 are geared directly to one another they rotate in opposite directions.

The resulting output on output shaft 220 is plus 48.6° for one revolution of the input shaft 202, which is a speed increase of 13.5% with a minimal decrease in torque from the input drive shaft 211 to the output shaft 220.

Figure 8:
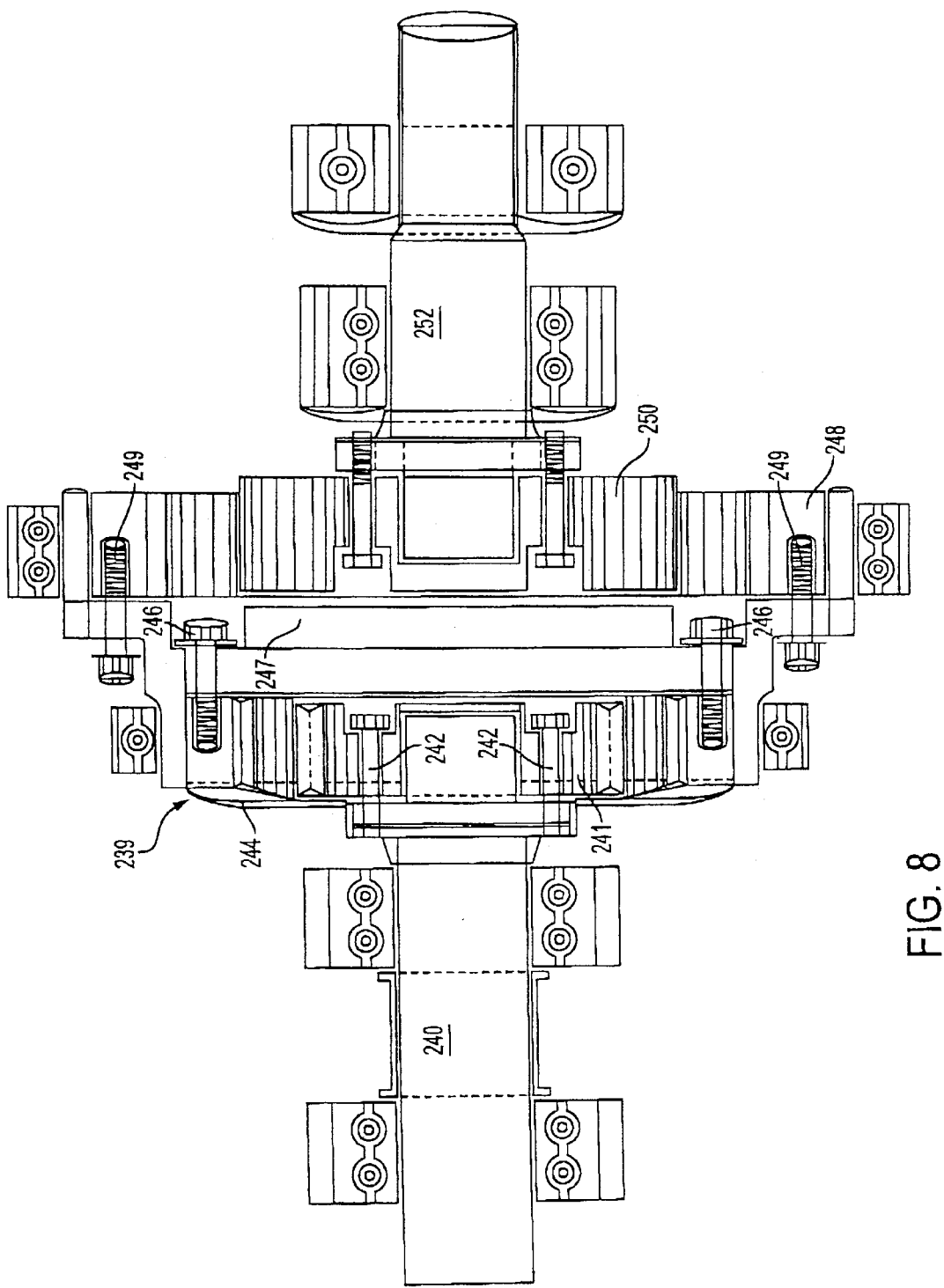
FIG. 8 is a side view of a sixth embodiment of a gear ratio multiplier of the present invention.

FIG. 8 shows a gear ratio multiplier configured as a compound internal ring and pinion gear set 239 wherein an input shaft 240 has an input pinion gear 241 fixed thereto by bolts 242. The input pinion gear 241 drives an input ring gear 244 which surrounds the input pinion gear and is bolted by bolts 246 to a base 247. The base 247 has bolted thereto an output ring gear 248 by bolts 249. Meshed with and surrounded by the output ring gear 248 is an output pinion gear 250 that is driven by output ring gear 250 that drives an output shaft 252. With the arrangement of the gear set 239 the pinion gears 241 and 250 are disposed within the ring gears 244 and 248, respectively providing an axially compact arrangement. The tooth ratios and pitch diameter ratios are such to provide the aforementioned advantages of the present invention. This arrangement may be employed optionally with a variable speed gear box on the input, the output or both.

Figure 9:
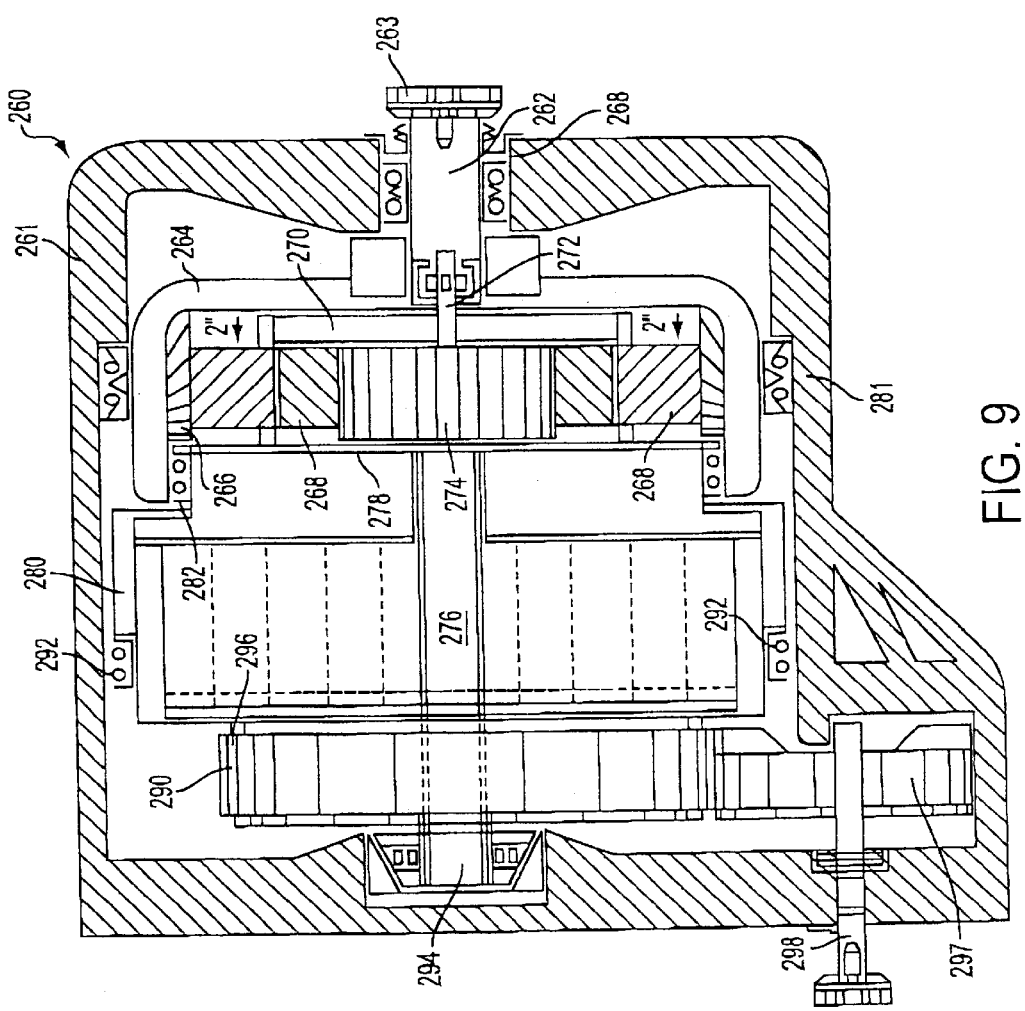
FIG. 9 is a cross-sectional view of a sixth embodiment of a gear ratio multiplier in accordance with the present invention.

Referring now to FIG. 9, there is shown a seventh embodiment of a gear ratio multiplier, identified generally by a numeral 260, the gear ratio multiplier 260 is a planetary gear assembly within a housing 261 comprising an input shaft 262 which is coupled to a driver such as the engine of FIG. 2 by a coupling 263 through a transmission 102 (see FIG. 2). The input shaft 262 is connected to a drum gear 264 having internal teeth 266. The internal teeth 266 of the drum gear 264 mesh with planetary gears 268 which are mounted on a frame 270 which is journaled by a shaft 272 to rotate freely with respect to the drum gear 264 fixed to the input shaft 262. The planetary gears 268 mesh with a sun gear 274, while the mounting shaft 276 of a frame 280 drives a hub 278 which is supported by a first set of bearings 282 in the frame 280 and is supported with respect to the housing 261 by bearings 292. The hub 278 has a gear 290 fixed thereto which is supported on a shaft 294. The gear 290 has teeth 296 which mesh with the teeth of an output pinion gear 297. Pinion gear 297 drives an output shaft 298. The output shaft 298 is coupled by a connector 107 (FIG. 2) to the propeller shaft 100 of the vehicle shown in FIG. 2.

Figure 10:
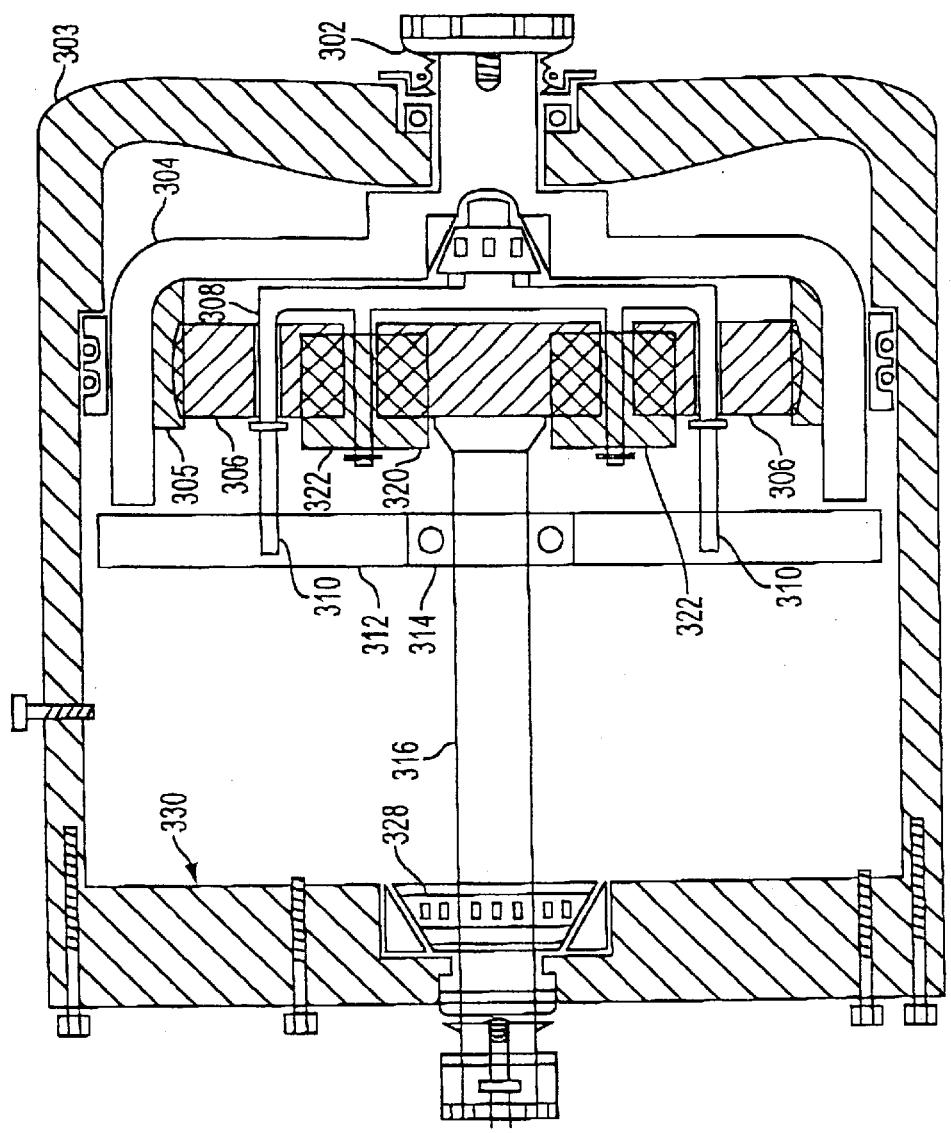
FIG. 10 is a cross-sectional view of a seventh embodiment of a gear ratio multiplier in accordance with the present invention.

Referring now to FIG. 10, where a eighth embodiment 300 of the speed reducing gear is illustrated, an input shaft 302 is journaled in a housing 303 and is unitary with a drum gear 304. In the drum gear 304 has internal teeth 305 which mesh with three planetary gears 306. The three planetary gears 306 are mounted on a frame 308 so configured to allow the planetary gears to rotate on shafts 310 which are part of the frame. The shafts 310 are mounted in the stabilizing plate 312 which is journaled by bearings 314 on an output shaft 316. At one end of the output shaft 316 there is fixed the sun gear 320. The sun gear 320 is driven by a second set of three of planetary gears 322 which in turn are driven by a first set of planetary gears 306 to rotate the spur gear or helical 320 with which the second set of planetary gears 322 are meshed. This drives the output shaft 316 to rotate within a bearing 328 mounted in an end plate 330 of the housing 303. The output shaft 316 is coupled by a coupling of 107 to a propeller shaft 100 when the arrangement is used to drive a vehicle (see FIG. 2).

The various embodiments of the invention shown have the underlying concept of input gear sets such as the input pinions and rings 18 and 16 of FIG. 1 and 160 and 162 of FIG. 4, and the output gear sets such as the output pinions and rings 12 and 14 of FIG. 1 and 168 and 166 of FIG. 4.

The gear sets have for example the following types of gears in the sets used together, but perhaps not limited to these combinations.

| GEARING TYPES (AS INPUT GEAR SETS) | GEARING TYPES (AS OUTPUT GEAR SETS) |
|---|---|
| 1. SPIRAL BEVEL | 1. SPIRAL BEVEL |
| 2. SPIRAL BEVEL | 2. HYPOIDS |
| 3. HYPOIDS | 3. SPIRAL BEVEL |
| 4. STRAIGHT BEVEL | 4. SPIRAL BEVEL |
| 5. STRAIGHT BEVEL | 5. HYPOID |
| 6. CONIFLEX BEVEL | 6. SPIRAL BEVEL |
| 7. CONIFLEX BEVEL | 7. HYPOID |
| 8. ZEROL BEVEL | 8. SPIRAL BEVEL |
| 9. ZEROL BEVEL | 9. HYPOID |
| 10. 90 DEGREE HELICAL BEVEL | 10. SPIRAL BEVEL |
| 11. 90 DEGREE HELICAL BEVEL | 11. HYPOID |
| 12. PLANOID | 12. SPIRAL BEVEL |
| 13. PLANOID | 13. HYPOID |
| 14. SPIROID | 14. SPIRAL BEVEL |
| 15. SPIROID | 15. HYPOID |
| 16. WORM | 16. SPIRAL BEVEL |
| 17. WORM | 17. HYPOID |
| 18. SPURS | 18. HELICAL AND BEVELS |

Figure 11:
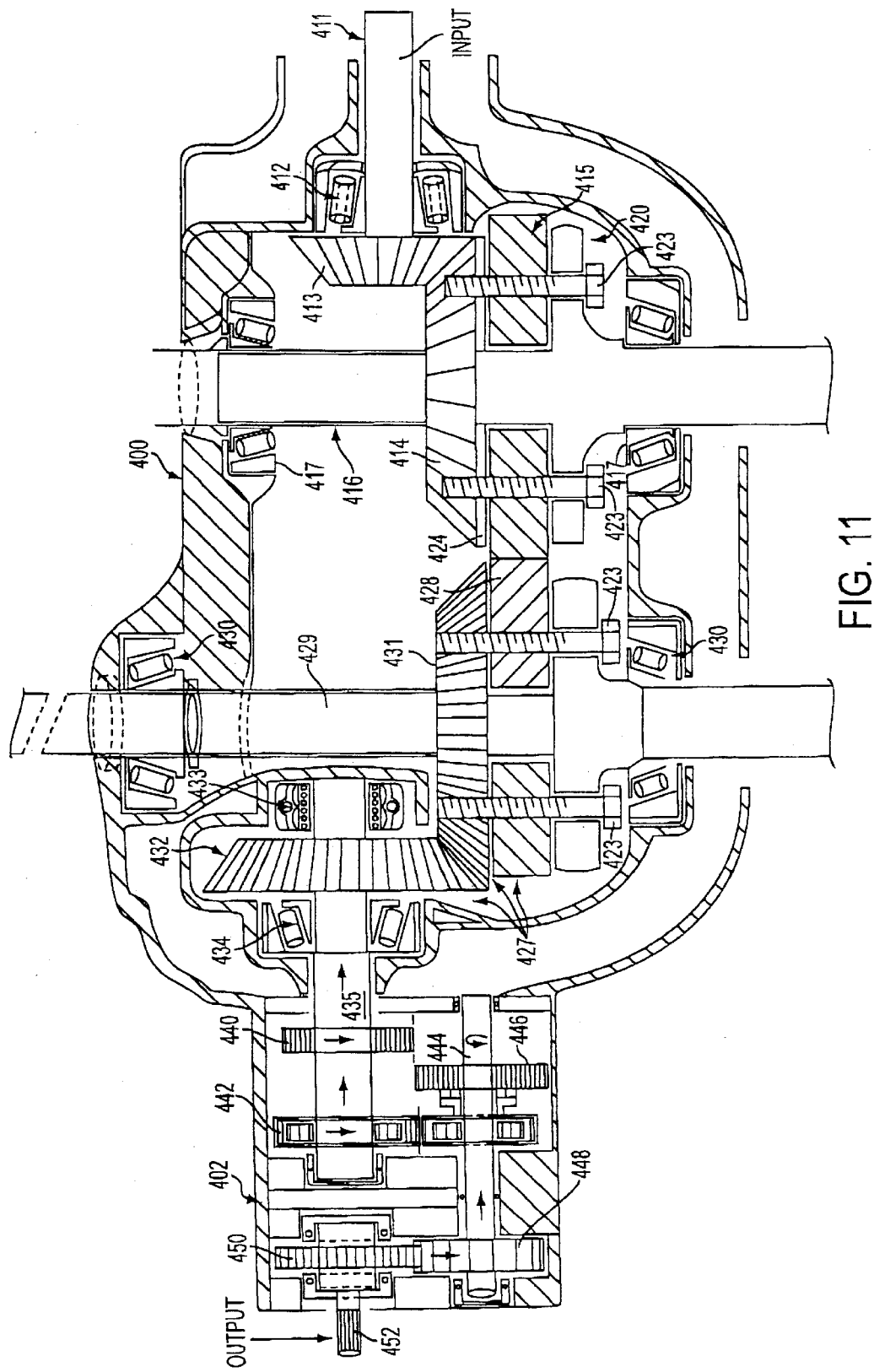
FIG. 11 is a cross-sectional view of a ninth embodiment of a gear ratio multiplier according to the present invention.

Referring now to FIG. 11, there is shown a ninth embodiment of the invention wherein a gear ratio multiplier 400 is optionally connected to a further transmission or gear box 402. The gear ratio multiplier 400 will first be described separately from the transmission 402 and then described as in combination with the transmission 402. It is to be kept in mind that the gear ratio multiplier 400 is a unit separate from the transmission 402 and has a utility of its own. For example, it can be used as an overdrive by itself as in the vehicle of FIG. 2.

Gear ratio multiplier 400 has an input shaft 411 mounted in input cone bearings 412. Input pinion 413 is fixed to the input shaft 411 and drives input ring gear 414 which is mounted on an intermediate shaft 416 that is in turn mounted in intermediate shaft bearings 417, which would be for example #10 bearing sets. The ring gear 414 and the intermediate shaft 416 support an input helical face gear 415. The gears 413, 414 and 415 provide an input gear set 420. Preferably, the input helical face gear 415 is bolted with bolts 423 to the first intermediate shaft 416 with a spacer 424 between the ring gear 414 and the helical face input gear 415.

The input gear set 420 is meshed to an output gear set 427 by an output helical face gear 428 driven by the input helical face gear 415. The helical face output gear 428 is fixed to a second intermediate shaft 429 by bolts 423. The second intermediate shaft 429 is mounted on intermediate shaft bearings 430 and supports an output ring gear 431. The output ring gear 431 drives an output pinion 432 which is mounted on an output shaft 435 that is supported by cone bearings 434 and an output nipple bearing 433 supports the inner end of the output shaft 435.

It is to be kept in mind that in its broadest aspect the gears may be of any configuration, however hypoid pinion gear and ring gear sets are preferred, with the input and output gears 415 and 428 being helical gears or perhaps spiral bevel gears or other types of gears.

Advantages of the gear ratio multiplier 400 are that the intermediate shafts 416 and 429 can be relatively short and can also provide potential outputs for driving other devices which may be coupled to these shafts. In addition, the intermediate shafts 416 and 429 may be hollow to allow effective internal heat ventilation to cool the transmission. In addition, by configuring the shafts as shown, there is a reduction in bearing load or rather a distribution of bearing load around the housing 400.

The gear ratio multiplier 400 of FIG. 11 can be configured using commercially available gears and gear sets that can be mounted in a compact housing.

The following is an example of gear type, tooth number and pitch diameters for the various gears shown in FIG. 11. These parameters are not to be interpreted as limiting with respect to this invention but are merely exemplary or illustrative.

Example III - Gear Ratio Multiplier 400

| GEAR | TYPE | TOOTH NUMBER | PITCH DIAMETER | |
|---|---|---|---|---|
| Input pinion 413 | Zerol Bevel | 12 | 4.2" | |
| Input ring 414 | Zerol Bevel | 18 | 6.3" | |
| TOOTH RATIO ~ 1.5 | | | PITCH DIAMETER RATIO ~ 1.6 TOTAL 1.5 | |
| Input face gear 415 | Helical | 22 | | Both Sets Combined |
| Output face gear 428 | Helical | 33 | | Primary & Secondary Gear Sets |
| TOOTH RATIO ~ 1.5 | | | PITCH DIAMETER RATIO ~ 1.5 + $^-$0.5 = 2.0 | |
| Output ring 431 | Hypoid | 48 | 7.2" | |
| Output pinion 432 | Hypoid | 20 | 3.75" | |
| TOOTH RATIO ~ 2.4 | | | PITCH DIAMETER RATIO ~ 1.92 | |
| 2.40–2.00 = $0.40_{1/2} = 0.^{+}20$ or 20% overdrive | | | $4.2 \div 6.3 = 1.5 + 0.5 = 2.0$ $2.0 - 1.92 = {}^{+}0.08$ Torque increase substantially flat after friction and heat | |

Referring now to the transmission 402 which is directly connected to the output shaft 435, it is seen that the transmission 402 includes a first spur gear 440 which is fixed to and rotates directly with the output shaft 435 and a second spur gear 442 which is also fixed to the output shaft 435. Mounted to slide on a parallel splined shaft 444 is a first gear 446 which meshes with the gear 440 to drive a fifth driven gear 448, with idler gear if needed wich meshes with a gear 450 fixed to an output drive shaft 452. By sliding gear 454 into engagement with gear 442, the spline shaft 444 changes the speed of gear 448 and thus the speed of the output gear 450 and 5 shaft 452. By having an idler gear, the direction of rotation of the output drive shaft 452 is reversed if needed.

The speed ratios between gears 440 and 446 is 1.1:1; the speed ratio between gears 442 and 454 is 1.18:1, and the speed ratio between gears 448 and 450 is 1.1:1. The pitch diameters of gears 440 and 446 are 4.0" and 4.2" providing a pitch diameter ratio of 1.05:1 while the pitch diameter of gear 442 is 4.5" and that of gear 454 is 3.7" resulting in a pitch diameter ratio of 1.21:1. These speed ratios and pitch diameter ratios are exemplarily only and of course may be changed to accommodate various situations and demands.

Figure 12:
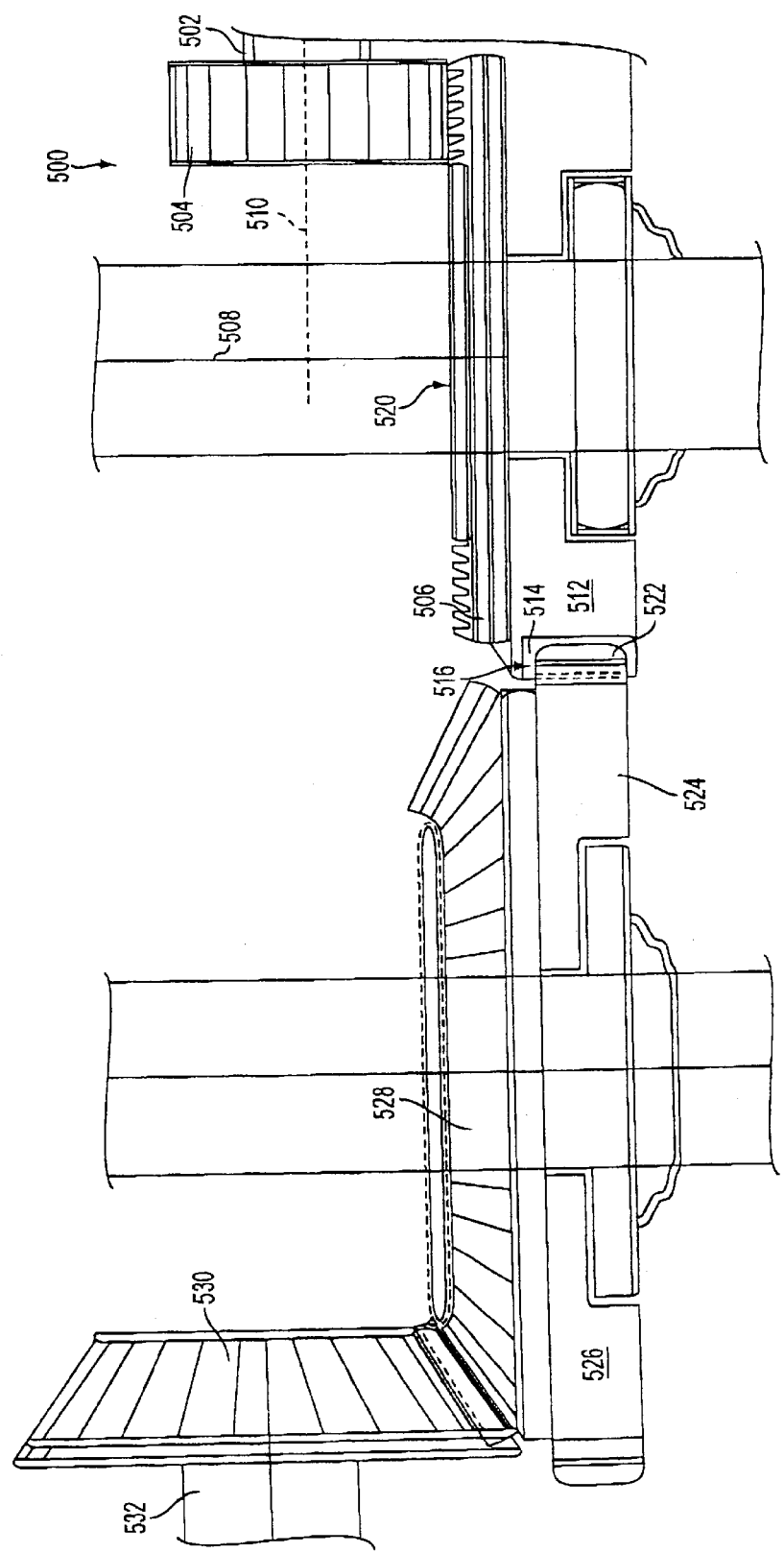
FIG. 12 is a cross-sectional view of a tenth embodiment of a gear ratio multiplier in accordance with the present invention.

Referring now to FIG. 12 there is shown a tenth embodiment of a gear ratio multiplier configured in accordance with the present invention, comprising an input shaft 502 which is fixed to an input pinion 504. The input pinion 504 drives a primary input ring gear 506 that rotates about an axis 508 which is perpendicular to the axis 510 of the input shaft 502. The primary input ring gear 506 is integral or unitary with input gear base 512 that has peripheral teeth 514 so as to form a secondary ring gear 516. The input gears of 504, 506 and 516 define an input gear set 520. The teeth 514 of the secondary input ring gear 506 mesh with teeth 516 of a secondary output ring gear 524. The secondary output ring gear 524 is integral or unitary with a gear base 526 which has mounted thereon a primary output ring gear 528 that rotates therewith. Secondary ring gear 528 meshes with an output pinion gear 530 that drives an output shaft 532.

The housing for embodiments from FIG. 1A through FIG. 12 is not limited to those embodiments designs. The housing might include alternative input shafts and/or output shafts arranged at 180 degrees, 90 degrees and/or at obtuse angles to attach additional multiplicative input pinions gears and/or output pinion gears as drivers and/or to be driven.

In the illustrated embodiment, the output ring gear 528 and output pinion 530 are spiral beveled gears or hypoids while the input pinion 504 and primary input ring gear 506 may be helical, spur or hypoid gears. The secondary ring gears 512 and 514 may be spur gears, helicals or double helical gears.

Configurations possible with the tenth embodiment 500 of FIG. 12 produce many ratios from 1:1 to 6:1. For example 9÷9=1:1 or 9÷1.5=6:1 while 38:38=1:1 or 38÷6=6.3:1.

It is emphasized that while an embodiment of these arrangements have been tested on and is suitable for road vehicles such as the rear wheel drive vehicle of FIG. 2, it is also usable with front-wheel drive vehicles, wherein one of the gear ratio multiplier assemblies is disposed between the transmission of the front-wheel drive vehicle and/or each of the shafts that drive the front wheels, i.e., two gear boxes are used. In addition, the gear assemblies shown in the embodiments of this inventive concept may be incorporated directly in automatic and manual transmissions between the output of the transmission and propeller shaft or other drive shafts coupled with the driving wheels of a vehicle.

The housing for embodiments from FIG. 1A through FIG. 12 is not limited to those embodiments designs. The housing might include alternative input shafts and/or output shafts arranged at 180 degrees, 90 degrees and/or at obtuse angles to attach additional multiplicative input pinions gears and/or output pinion gears as drivers and/or to be driven.

While the gear reduction assembly concept disclosed herein has thus far been successfully tested in pickup trucks, it is emphasized that the principles and concepts herein are utilized also in passenger vehicles, boats such as pleasure boats, and sea going vessels, airborne aviation equipment, helicopters, light trucks and heavy trucks, motorcycles and construction equipment. While these are specific examples with which the present invention is used, the present invention may be industrial or household utilized in other types of power-driven industrial and/or household devices, such as but not limited to AC and DC electric motors, water wheels, windmills, hybrid systems, generators, motors, electric cars, pneumatic devices and/or welding machines.

Referring now to FIG. 13, there are shown the results of a 3 minute dynameter test at 71 MPH comparing torque and horsepower for a vehicle using the gear ratio multiplier 10 of FIGS. 1 and 2 and for the same vehicle not using the gear ratio multiplier. The horsepower not using the gear ratio multiplier 10 is represented by curve 700 and has an average value of 37.6 hp, while the horsepower using the gear ratio multiplier 10 is represented by the curve 701 and has an average value of 41.7 hp. Use of the gear ratio multiplier 10 results in a horsepower gain of 5.1 hp. The torque not using the gear ratio multiplier is represented by curve 702 and has a value ov 20.0 ft-lbs, while the torque using the gear ratio multiplier 10 is represented by the curve 703 and has an average value of 21.52 ft-lbs, resulting in an average torque gain for 1.52 ft-lbs.

Figure 14:
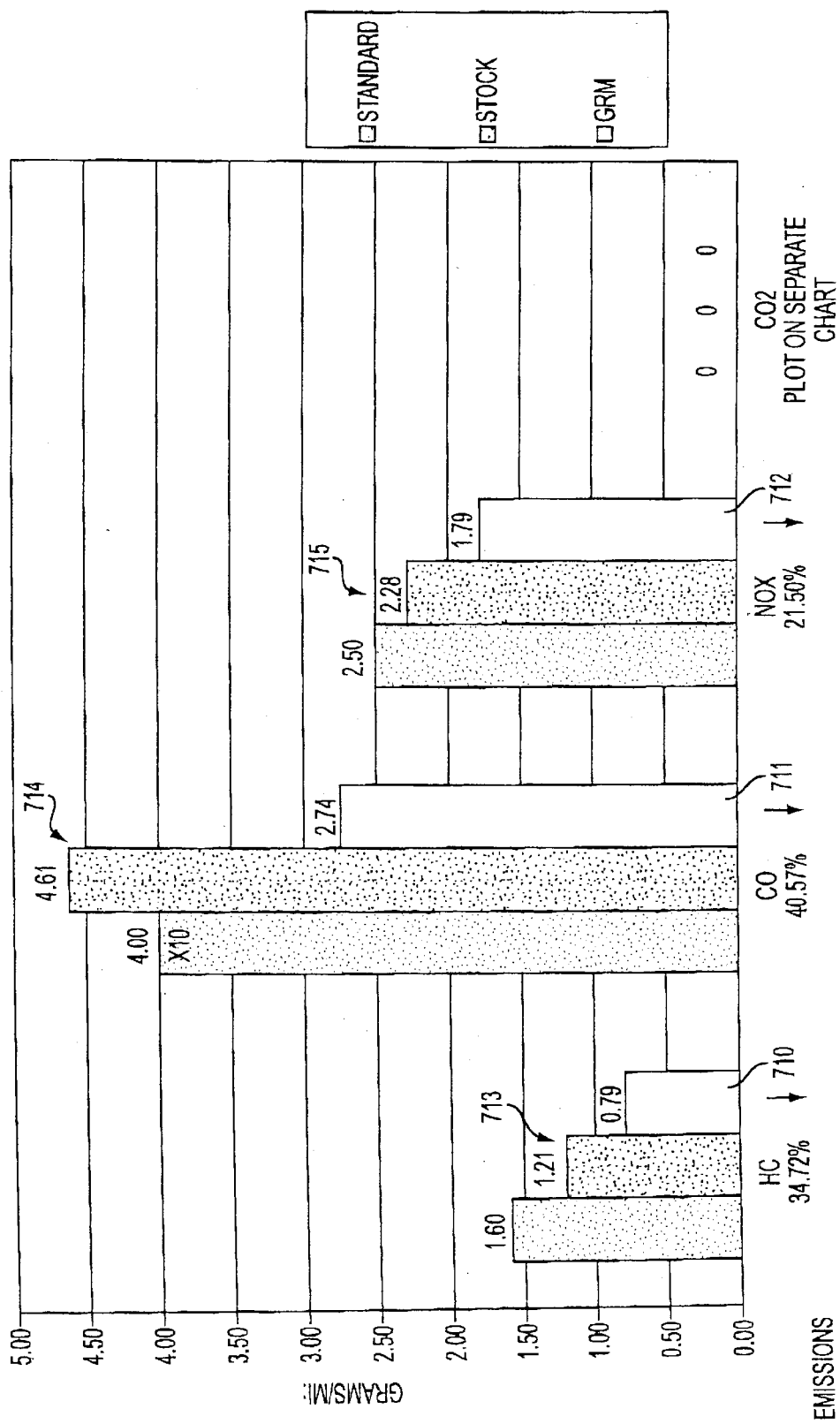
FIG. 14 is a bar graph showing comparisons of hydrocarbon, carbon monoxide and nitrous oxide emissions for a stock vehicle, the government standard and applicant's invention.

Referring now to FIG. 14, the bar graph shows emission reductions of 34.72% in hydrocarbons, 40.57% in carbon monoxide and 21.50% in nitrous oxide using the gear ratio multiplier 10 represented by bars 710, 711 and 712, respectively, as compared to bars 713, 714 and 715 for the same vehicle not using the gear ratio multiplier.

Referring now to FIGS. 15 and 16, for the same vehicle, it is seen that the hydrocarbon, carbon monoxide and nitrous oxide emissions are substantially reduced, while miles-per-gallon (fuel economy) is substantially increased.

A state of California test at the Clean Air Vehicle Technology Center had the following test results for a stock 1997 Dodge Ram 1500 pickup truck:

Example IV

| Stock Vehicle | | | | | | |
|---|---|---|---|---|---|---|
| Phase Variables | | | | | | |
| | Begin | End | Length | Viol | Dist (mi) | Vimx (ft3) |
| Phase 1 | 8:35:13 | 8:43:40 | 507 | 2.9 | 3.626 | 2852.16 |
| Phase 2 | 8:43:40 | 8:58:10 | 870 | 0 | 3.877 | 4863.84 |
| Phase 3 | 9:08:11 | 9:16:38 | 507 | 0 | 3.585 | 2831.76 |

| Bag Readings | | | | | | | |
|---|---|---|---|---|---|---|---|
| | HC ppmC | CO ppm | NOX ppm | % CO2 | CH4 ppm | NMHC ppm | DF |
| Phase 1 | | | | | | | |
| Full Scale | 284.20 | 471.30 | 28.45 | 4.70 | 45.50 | | 7.84 |
| Sample Conc. | 73.17 | 444.981 | 13.923 | 1.644 | 8.478 | 64.121 | |
| Ambient Conc. | 5.919 | 1.531 | 0.178 | 0.063 | 3.533 | 1.920 | |
| Net Conc. | 68.553 | 443.646 | 13.768 | 1.589 | 5.395 | 62.446 | |
| Grams | 3.194 | 41.707 | 1.760 | 2347.86 | 0.251 | 2.909 | |

-continued

Stock Vehicle

Phase 2

| | | | | | | |
|---|---|---|---|---|---|---|
| Full Scale | 28.06 | 95.84 | 28.45 | 1.88 | 45.50 | 12.89 |
| Sample Conc. | 15.829 | 64.177 | 1.391 | 1.023 | 4.344 | 10.912 |
| Ambient Conc. | 5.316 | 0.947 | 0.122 | 0.053 | 2.176 | 2.852 |
| Net Conc. | 10.925 | 63.304 | 1.279 | 0.974 | 2.336 | 8.281 |
| Grams | 0.868 | 10.149 | 0.279 | 2454.50 | 0.186 | 0.658 |

Phase 3

| | | | | | | |
|---|---|---|---|---|---|---|
| Full Scale | 28.06 | 471.30 | 28.45 | 1.88 | 45.50 | 9.08 |
| Sample Conc. | 19.075 | 0.369 | 6.813 | 1.454 | 5.875 | 12.426 |
| Ambient Conc. | 5.067 | 0.608 | 0.107 | 0.053 | 2.225 | 2.548 |
| Net Conc. | 14.567 | 89.828 | 6.718 | 1.407 | 3.895 | 10.159 |
| Grams | 0.674 | 8.384 | 0.853 | 2064.28 | 0.180 | 0.470 |

Test Results

| | THC | CO | NOx | CO2 | CH4 | NMHC | MPG |
|---|---|---|---|---|---|---|---|
| Grams/mi | 0.351 | 4.388 | 0.203 | 620.42 | 0.053 | 0.2906 | 13.588 |

Example V

STOCK VEHICLE EQUIPPED WITH GEAR RATIO MULTIPLIER OF FIG. 1B

Phase Variables

| | Begin | End | Length | Viol | Dist (mi) | Vimx (ft3) |
|---|---|---|---|---|---|---|
| Phase 1 | 9:39:10 | 9:51:56 | 765.7 | 0 | 10.270 | 4155.62 |

Bag Readings

| | HC ppmC | CO ppm | NOX ppm | % CO2 | CH4 ppm | NMHC ppm | DF |
|---|---|---|---|---|---|---|---|

Phase 1

| | | | | | | | |
|---|---|---|---|---|---|---|---|
| Full Scale | 64.65 | 471.30 | 28.45 | 4.70 | 46.06 | | 5.81 |
| Sample Conc. | 27.046 | 133.860 | 4.120 | 2.272 | 7.643 | 18.395 | |
| Ambient Conc. | 4.916 | 0.063 | 0.110 | 0.053 | 2.111 | 2.527 | |
| Net Conc. | 22.976 | 133.808 | 4.029 | 2.228 | 5.896 | 16.302 | |
| Grams | 1.559 | 18.328 | 0.804 | 4798.51 | 0.400 | 1.107 | |

Test Results

| | THC | CO | NOx | CO2 | CH4 | NMHC | MPG |
|---|---|---|---|---|---|---|---|
| Grams/mi | 0.152 | 1.785 | 0.078 | 467.25 | 0.039 | 0.108 | 18.147 |

Clearly, all emissions were lower using the gear ratio multiplier of FIG. 1B as is the MPG in a comparative test.

Figure 17:
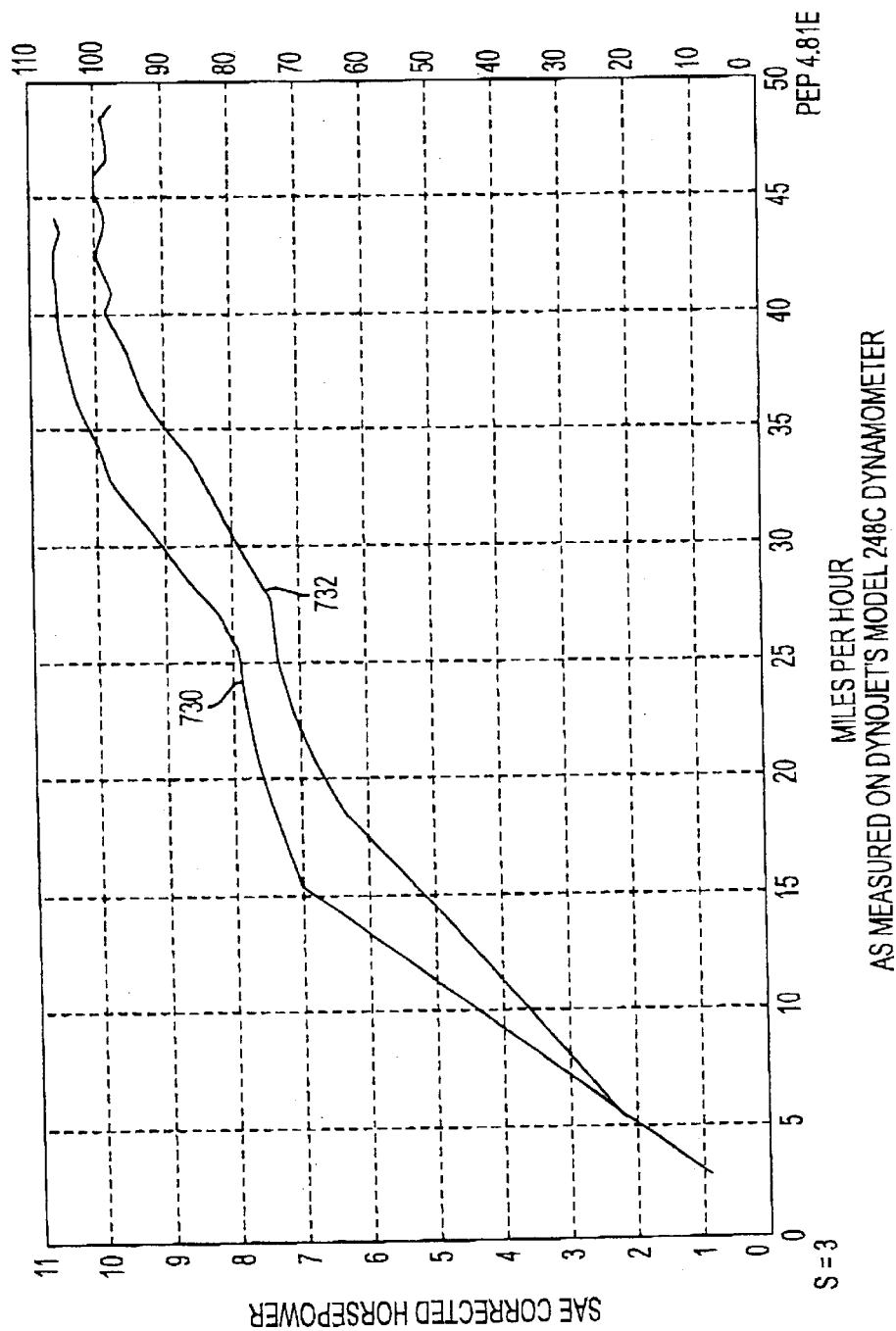
FIG. 17 is a graph plotting horse power as a function of speed.

Referring now to FIG. 17, there is shown the results of dynameter tests using the overdrive of FIG. 4 wherein speed in miles per hour is plotted as a function of horse power. Curve 730 plots a stock vehicle without the gear ratio multiplier 150 of FIG. 4 and curve 732 plots the same vehicle with the gear ratio multiplier 150 of FIG. 4 inserted. Both tests were run only in first gear. As is apparent from FIG. 17, more horse power is expended by the stock vehicle than the same vehicle modified by the gear ratio modifier 150 of FIG. 4. The test of FIG. 15 RG 240 Drive Cycle (State Test) was conducted on Born Again Cars, Dallas, Tex. The specific vehicle was a 1990 Ford model F-150 pickup rear wheel drive powered by a 5.8 liter, eight cylinder engine and weighing 4750 lbs.

The following acceleration test results were obtained for acceleration from 20 mph to 45 mph:

Example VI

| Tests On Stock Vehicle | | | |
|---|---|---|---|
| Test No. | Result (secs) | Max HP | Max RPM |
| 1 | 4.0 | 122.0 | 3500 |
| 2 | 3.5 Avg. 3.9 | 136.7 Avg. 131 | 3500 Avg. 3500 |
| 3 | 4.2 | 134.3 | 3500 |

| Tests On Stock Vehicle With Gear Ratio Multiplier 150 of FIG. 4 | | | | |
|---|---|---|---|---|
| Test No. | Result (secs) | Max HP | Max RPM | |
| 1 | 4.5 | 129.8 | 2713 | 3,500 |
| 2 | 4.0 Avg. 4.0 | 133.3   133.6 | 2879 | Avg. = 2,785 |
| 3 | 3.7 1/10 of a | 139.1  −131.0 | 2761 | 715 R.P. N |
| 4 | 3.8 second longer | 132.5  H.P. 2.6 Increase | 2787 | 25–67% Less |

Avg. R.P.M. decrease of 715 R.P.M. with an Avg Speed Increase of 6 to 6.6 M.P.H.
25.6% plus 13.0%=38.67% total gain.
38% minus 4%=34% net gain.

Clearly, there is substantially less engine work using the gear ratio multiplier 150 of FIG. 4 because the RPM's are substantially less for the maximum horsepower obtained which translates into lower fuel consumption and therefore lower exhaust emissions.

Tests were also conducted on the identical vehicle starting at 2000 RPM and accelerated to 3500 RPM.

| Max HP | | Max M.P.H. | |
|---|---|---|---|
| Tests On Stock Vehicle | | | |
| 152.3 | | 51.0 | |
| 166.1 | Avg. 158.3 | 51.7 | Avg. 51.1 |
| 159.0 | | 50.5 | |
| 156.1 | | 51.4 | |
| Tests on Stock Vehicle With Gear Ratio Multiplier 150 of FIG. 4 | | | |
| 145.9 | | 158.3 | 57.4 | |
| 147.4 | Avg. −151.8 | 57.5 | 57.76 |
| 155.7 | Decrease  6.5 = 4% | 57.4 | Avg. −51.1 |
| 143.1 | | 58.1 | 6.6 |
| 167.8 | | 58.2 | Increase 13% |
| 150.9 | | 58.0 | |

From comparing the tests, it is clear that the vehicle equipped with the gear ratio multiplier 150 of FIG. 4 had higher speeds at lower horsepower when accelerating from 2000 RPM to 3500 RPM which again translates into lower fuel consumption and lower exhaust emissions.

From the foregoing description, one skilled in the art can easily ascertain the essential characteristics of this invention, and without departing form the spirit and scope thereof, can make various changes and modifications of the invention to adapt it to various usages and conditions.

What is claimed is:

1. A gear ratio multiplier comprising:
   an input shaft adapted for connection to a source of power for providing rotation and torque at a first speed;
   a first gear assembly connected to the input shaft, said first gear assembly comprising gears fixed in a meshed relationship with respect to one another, including at least one gear having teeth disposed at an angle to the axis of said at least one, said first gear assembly having an output with a lower rotational distance and higher torque than the rotational distance and torque of the input shaft; and
   a second gear assembly connected to the output of the first gear assembly, the second gear assembly comprising gears fixed in a meshed relationship with respect to one another, with the relative sizes of the gears in the second gear assembly being different from the relative size of the gears of the first gear assembly; and
   an output shaft driven by the second gear assembly, the output shaft having a speed greater than the speed of the input shaft and being adapted for connection to a device to be driven by the source of rotation and torque,
   wherein the first gear assembly comprises an input pinion gear and an input ring gear with the input ring gear having a larger pitch diameter and more teeth than the input pinion, and wherein the second gear assembly has an output ring gear with a pitch diameter greater than the pitch diameter of the input ring gear and with the output ring gear driving an output pinion gear connected to the output shaft, said output pinion gear having a pitch diameter greater than the pitch diameter of the input pinion gear.

2. The gear ratio multiplier of claim 1 wherein the output ring gear nests within the input ring gear on the same side of the pinions.

3. The gear ratio multiplier of claim 2 wherein the input pinion has more teeth than the output pinion.

4. The gear ratio multiplier of claim 1 further including a first transmission connected to the input shaft for changing the speed of the input shaft with respect to a drive shaft.

5. The gear ratio multiplier of claim 4 further including a second transmission connected to the output shaft for changing the speed of a driven shaft with respect to the output shaft.

6. The gear ratio multiplier of claim 4 wherein the first transmission is a speed increasing gear assembly for which more than one gear ratio may be selected.

7. The gear ratio multiplier of claim 6 wherein one ratio is substantially 1:1.

8. The gear ratio multiplier of claim 6 further including an additional output shaft coupled by gears to or on the output shaft.

9. The gear ratio multiplier of claim 1 wherein the gears are spiral bevel gears.

10. The gear ratio multiplier of claim 9 wherein the ring and pinion gears of the first gear assembly and the gears of the second gear assembly are of opposite hand with respect to teeth design.

11. The gear ratio multiplier of claim 1 wherein the gears are hypoids gears.

12. The gear ratio multiplier of claim 11 wherein the gears of the first gear assembly and the gears of the second gear assembly are of opposite hand.

13. The gear ratio multiplier of claim 1 wherein the output pinion gear has the same number of teeth as the input pinion gear, and wherein the output ring gear has a larger number of teeth than the input ring gear; with the first gear assembly having a tooth number ratio smaller than the tooth number ratio of the second gear assembly, and the first gear assembly having a pitch diameter ratio greater than the pitch diameter ratio of the second gear assembly.

14. The gear ratio multiplier of claim 13 wherein input ring gear and output ring gear are on the same side of the pinion gears with the input ring gear nested within the output ring gear.

15. The gear ratio multiplier of claim 14 further including a speed changing transmission connected to the input shaft of the input pinion.

16. The gear ratio multiplier of claim 14 further including a speed changing transmission connected to the output shaft of the output pinion.

17. The gear ratio multiplier of claim 14 wherein there are speed changing transmissions connected to both the input and output shafts of both the input and output pinions.

18. The gear ratio multiplier of claim 13 further including a speed decreasing gearing on the output shaft.

19. The gear ratio multiplier of claim 18 further comprising direction reversing gearing on the output shaft connected to the output pinion.

20. A gear ratio multiplier according to claim 1 wherein the first gear assembly is fixed to rotate the second gear assembly by intermediate meshing gears one of which is fixed to the input ring gear and the other of which is fixed to the output ring gear.

21. The gear ratio multiplier of claim 20 further including a speed changing transmission connected to the output shaft.

22. The gear ratio multiplier of claim 20 further comprising a first lateral shaft extending transverse to the input shaft mounting the input ring gear and a second lateral shaft extending transverse to the input shaft mounting the output ring gear.

23. The gear ratio multiplier of claim 22 wherein at least one of the transverse shafts extend out of a housing containing the gear ratio multiplier and is adapted to drive an auxiliary device.

24. The gear ratio multiplier of claim 1 wherein the input pinion is disposed inside of the input ring gear with the input ring gear having inwardly facing teeth, wherein the output pinion is disposed within the output ring gear with the output ring gear also having inwardly facing teeth.

* * * * *